United States Patent
Morimoto et al.

(10) Patent No.: US 12,268,113 B2
(45) Date of Patent: Apr. 8, 2025

(54) AGRICULTURAL MACHINE

(71) Applicant: KUBOTA CORPORATION, Osaka (JP)

(72) Inventors: Takanori Morimoto, Sakai (JP); Yusuke Takahashi, Sakai (JP); Yusuke Minakata, Sakai (JP); Kanta Nakaguchi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 194 days.

(21) Appl. No.: 17/951,261

(22) Filed: Sep. 23, 2022

(65) Prior Publication Data

US 2023/0015153 A1 Jan. 19, 2023

Related U.S. Application Data

(63) Continuation of application No. PCT/JP2021/008345, filed on Mar. 4, 2021.

(30) Foreign Application Priority Data

Mar. 31, 2020 (JP) .................................. 2020-065146

(51) Int. Cl.
  *A01B 69/04* (2006.01)
  *G05D 1/00* (2024.01)

(52) U.S. Cl.
  CPC ......... *A01B 69/008* (2013.01); *G05D 1/0016* (2013.01); *G05D 1/0061* (2013.01); *G05D 1/0217* (2013.01); *G05D 1/0219* (2013.01)

(58) Field of Classification Search
  CPC .. A01B 69/008; A01B 69/001; G05D 1/0016; G05D 1/0061; G05D 1/0217; G05D 1/0219; G05D 1/024; G05D 1/0255
  See application file for complete search history.

(56) References Cited

U.S. PATENT DOCUMENTS

2019/0227561 A1    7/2019  Hiramatsu
2020/0359549 A1*  11/2020  Sakaguchi ........... G05D 1/0278
(Continued)

FOREIGN PATENT DOCUMENTS

JP    05-260804 A    10/1993
JP    2002-067990 A   3/2002
(Continued)

OTHER PUBLICATIONS

Official Communication issued in International Patent Application No. PCT/JP2021/008345, mailed on May 18, 2021.
(Continued)

*Primary Examiner* — Anne Marie Antonucci
*Assistant Examiner* — Jewel Ashley Kuntz
(74) *Attorney, Agent, or Firm* — Keating & Bennett, LLP

(57) ABSTRACT

An agricultural machine includes a vehicle body, a travel switch operable to issue a command to start autonomous travel of the vehicle body, and an autonomous travel controller to perform autonomous travel of the vehicle body based on a planned travel line when the command is issued. When the command is issued by operating the travel switch, if at least one of a positional deviation between the planned travel line that is selected and the vehicle body and an orientational deviation between the planned travel line and an orientation of the vehicle body is greater than or equal to a corresponding one of respective first thresholds, the autonomous travel controller is configured or programmed to perform line alignment to make the positional deviation and the orientational deviation less than the respective first thresholds.

18 Claims, 19 Drawing Sheets

(56) References Cited

U.S. PATENT DOCUMENTS

2021/0105929 A1 4/2021 Miyashita et al.
2021/0114659 A1 4/2021 Miyashita et al.

FOREIGN PATENT DOCUMENTS

| JP | 2010-200674 A | 9/2010 | | |
|----|---------------|--------|---|---|
| JP | 2017-162373 A | 9/2017 | | |
| JP | 2018-050491 A | 4/2018 | | |
| JP | 2018-055180 A | 4/2018 | | |
| JP | 2019-038535 A | 3/2019 | | |
| JP | 2020018236 A | * | 2/2020 | ........... A01B 69/008 |
| WO | 2019123923 A1 | 6/2019 | | |
| WO | 2020/003561 A1 | 1/2020 | | |
| WO | WO-2020003563 A1 | * | 1/2020 | ........... A01B 69/008 |

OTHER PUBLICATIONS

Official Communication issued in corresponding Japanese Patent Application No. 2020-065146, mailed on Nov. 21, 2023.
Official Communication issued in corresponding European Patent Application No. 21781268.4, mailed on Mar. 26, 2024, 8 pages.

* cited by examiner

Fig.12D
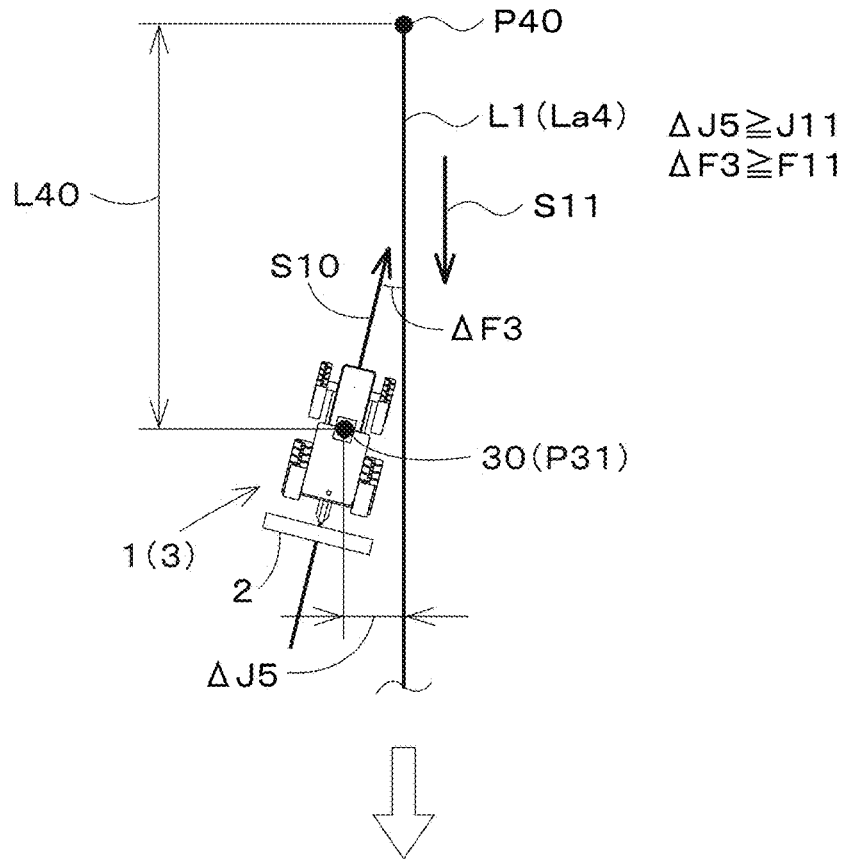
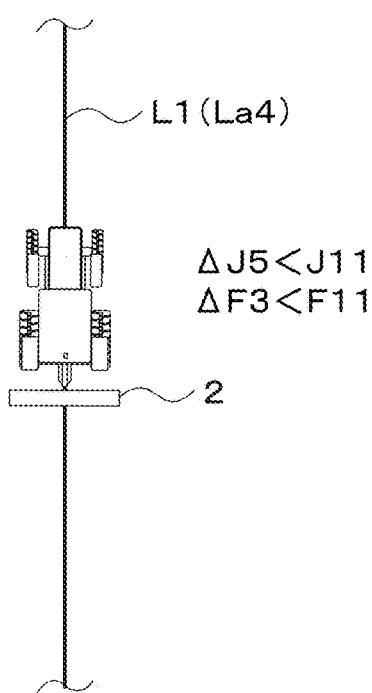

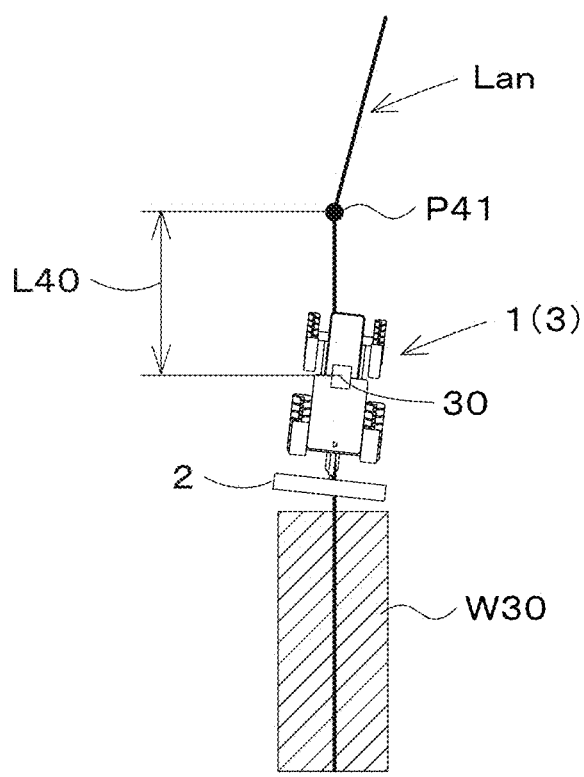

AGRICULTURAL MACHINE

CROSS REFERENCE TO RELATED APPLICATIONS

This application is a continuation application of International Application No. PCT/JP2021/008345, filed on Mar. 4, 2021, which claims the benefit of priority to Japanese Patent Application No. 2020-065146, filed on Mar. 31, 2020. The entire contents of each of these applications are hereby incorporated herein by reference.

BACKGROUND OF THE INVENTION

1. Field of the Invention

The present invention relates to agricultural machines such as a tractor, a combine, and a rice transplanter.

2. Description of the Related Art

To date, a known agricultural machine performs autonomous travel. The agricultural machine (agricultural working vehicle) disclosed in Japanese Unexamined Patent Application Publication No. 2019-38535 includes a vehicle position calculating unit that calculates the position of the vehicle, a vehicle orientation calculating unit that calculates a travel orientation of the vehicle, a positional deviation computing unit that computes a positional deviation that is a positional displacement in a lateral direction of the vehicle with respect to a target travel path, an orientational deviation computing unit that computes an orientational deviation between an orientational line of the target travel path and the travel orientation, a first control computing unit that outputs a first steering value by using the positional deviation and a target positional deviation as input parameters, a second control computing unit that outputs a second steering value by using the orientational deviation, a target orientational deviation, and the positional deviation as input parameters, a target steering computing unit that outputs a target steering value for traveling along the target travel path based on the first steering value and the second steering value, a steering drive controller that outputs a steering drive signal by using the target steering value as an input; and a steering drive unit that performs steering of a steering wheel based on the steering drive signal.

SUMMARY OF THE INVENTION

With the agricultural machine disclosed in Japanese Unexamined Patent Application Publication No. 2019-38535, it is possible to cause the agricultural machine to travel along the target travel path by using the positional deviation and the orientational deviation. However, with this agricultural machine, it is difficult to smoothly shift to autonomous travel after interrupting autonomous travel, causing a tractor to deviate from the target travel path, and returning the agricultural machine to the target travel path.

In consideration of such circumstances, preferred embodiments of the present invention provide agricultural machines each that can smoothly shift to autonomous travel when performing autonomous travel at least after moving a vehicle body that has deviated from a planned travel line closer to the planned travel line.

An agricultural machine includes a vehicle body, a travel switch operable to issue a command to start autonomous travel of the vehicle body, and an autonomous travel controller to perform autonomous travel of the vehicle body based on a planned travel line when the command is issued. When the command is issued by operating the travel switch, if at least one of a positional deviation between the planned travel line that is selected and the vehicle body and an orientational deviation between the planned travel line and an orientation of the vehicle body is greater than or equal to a corresponding one of respective first thresholds, the autonomous travel controller is configured or programmed to perform line alignment to make the positional deviation and the orientational deviation less than the respective first thresholds.

The planned travel line may include a straight movement portion to cause the vehicle body to move straight and a turning portion to cause the vehicle body to turn. The autonomous travel controller may be configured or programmed to determine whether at least one of a positional deviation between the straight movement portion and the vehicle body and an orientational deviation between the straight movement portion and the orientation of the vehicle body is greater than or equal to the corresponding first threshold, and, if the at least one of the positional deviation and the orientational deviation is greater than or equal to the corresponding first threshold, make, as the line alignment, the positional deviation and the orientational deviation with respect to the straight movement portion less than the respective first thresholds.

The autonomous travel controller may be configured or programmed to perform the line alignment by controlling traveling and steering of the vehicle body.

In the line alignment, the autonomous travel controller may be configured or programmed to perform a K-turn by moving the vehicle body forward and then moving the vehicle body backward.

In the line alignment, the autonomous travel controller may be configured or programmed to perform the K-turn a plurality of times and start the autonomous travel if the number of times that the K-turn is performed becomes greater than or equal to a predetermined number of times.

The autonomous travel controller may be configured or programmed to not perform the line alignment if a distance between a vehicle body position that is a position of the vehicle body when the command is issued by operating the travel switch and an end portion of a planned travel line in a movement direction of the vehicle body is less than a predetermined distance.

The agricultural machine may include a device information acquirer to acquire device information about a working device attached to the vehicle body, and the autonomous travel controller may be configured or programmed to determine whether or not to perform the line alignment based on the device information acquired by the device information acquirer.

The autonomous travel controller may be configured or programmed to not perform the line alignment if the working device indicated by the device information is a predetermined working device.

The agricultural machine may include a position detector to detect a vehicle body position that is a position of the vehicle body. When the command is issued by operating the travel switch, if the vehicle body position detected by the position detector is a start position defined in the planned travel line, the autonomous travel controller may be configured or programmed to perform position alignment to align the vehicle body position with the start position.

The autonomous travel controller may be configured or programmed to perform autonomous travel of the vehicle body if at least one of the positional deviation and the orientational deviation is less than or equal to a corresponding one of respective second thresholds greater than the corresponding first threshold.

The autonomous travel controller may be configured or programmed to determine, if at least one of the positional deviation and the orientational deviation is less than or equal to the corresponding second threshold, whether or not the at least one of the positional deviation and the orientational deviation is greater than or equal to the corresponding first threshold, perform the line alignment and then perform autonomous travel of the vehicle body if the at least one of the positional deviation and the orientational deviation is greater than or equal to the corresponding first threshold, and not perform the line alignment but perform autonomous travel of the vehicle body if the at least one of the positional deviation and the orientational deviation is not greater than or equal to the corresponding first threshold.

The agricultural machine may include an input interface to input a precision of work of the working device, and the autonomous travel controller may be configured or programmed to change the first threshold or thresholds based on the precision of the work input via the input interface.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 12D illustrates an example of line alignment.

FIG. 12E illustrates a state in which a straight movement portion is bent.

DETAILED DESCRIPTION OF THE PREFERRED EMBODIMENTS

Figure 1:
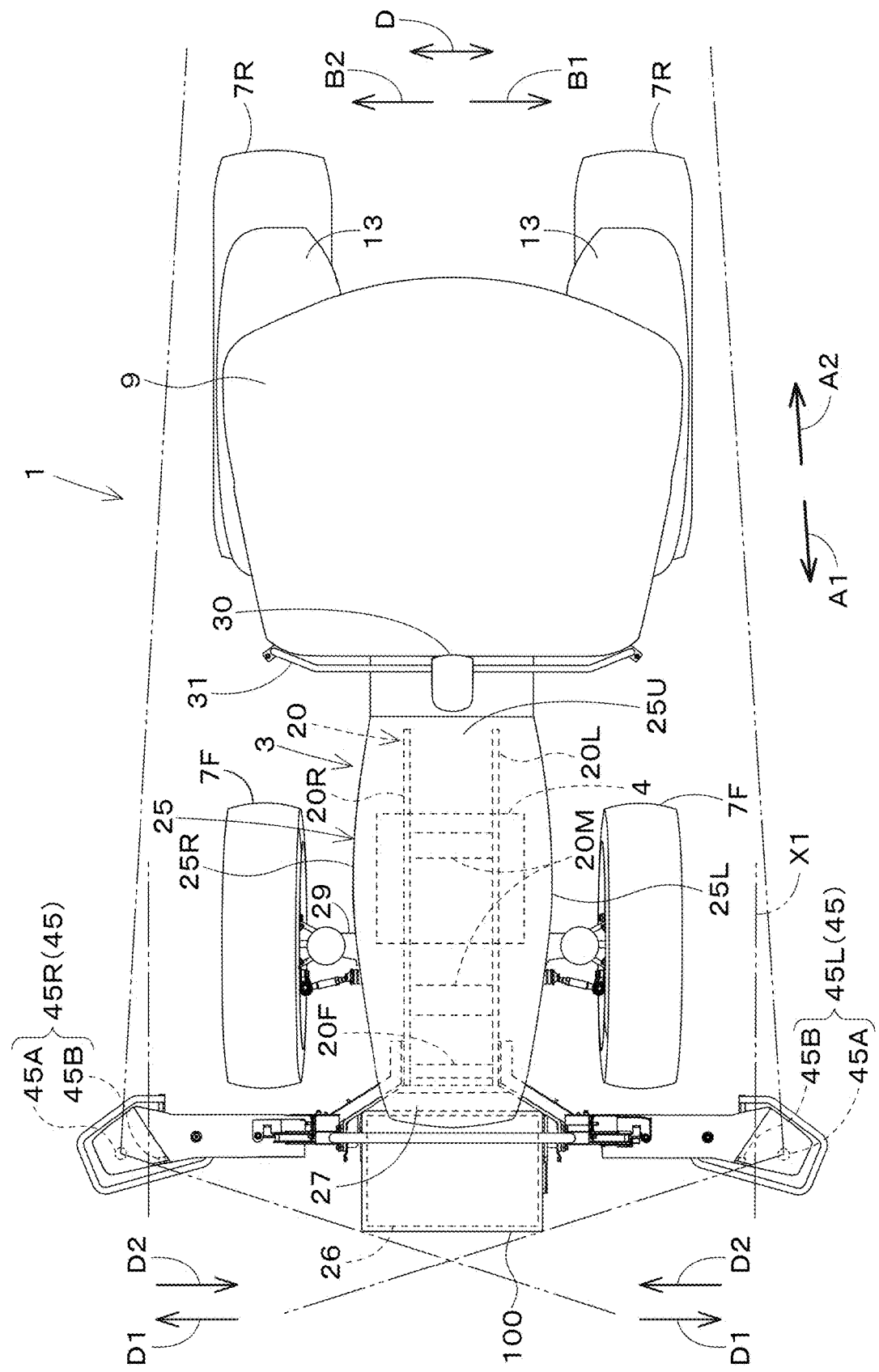
FIG. 1 is an overall plan view of a tractor.

The preferred embodiments will now be described with reference to the accompanying drawings, wherein like reference numerals designate corresponding or identical elements throughout the various drawings. The drawings are to be viewed in an orientation in which the reference numerals are viewed correctly.

Figure 2:
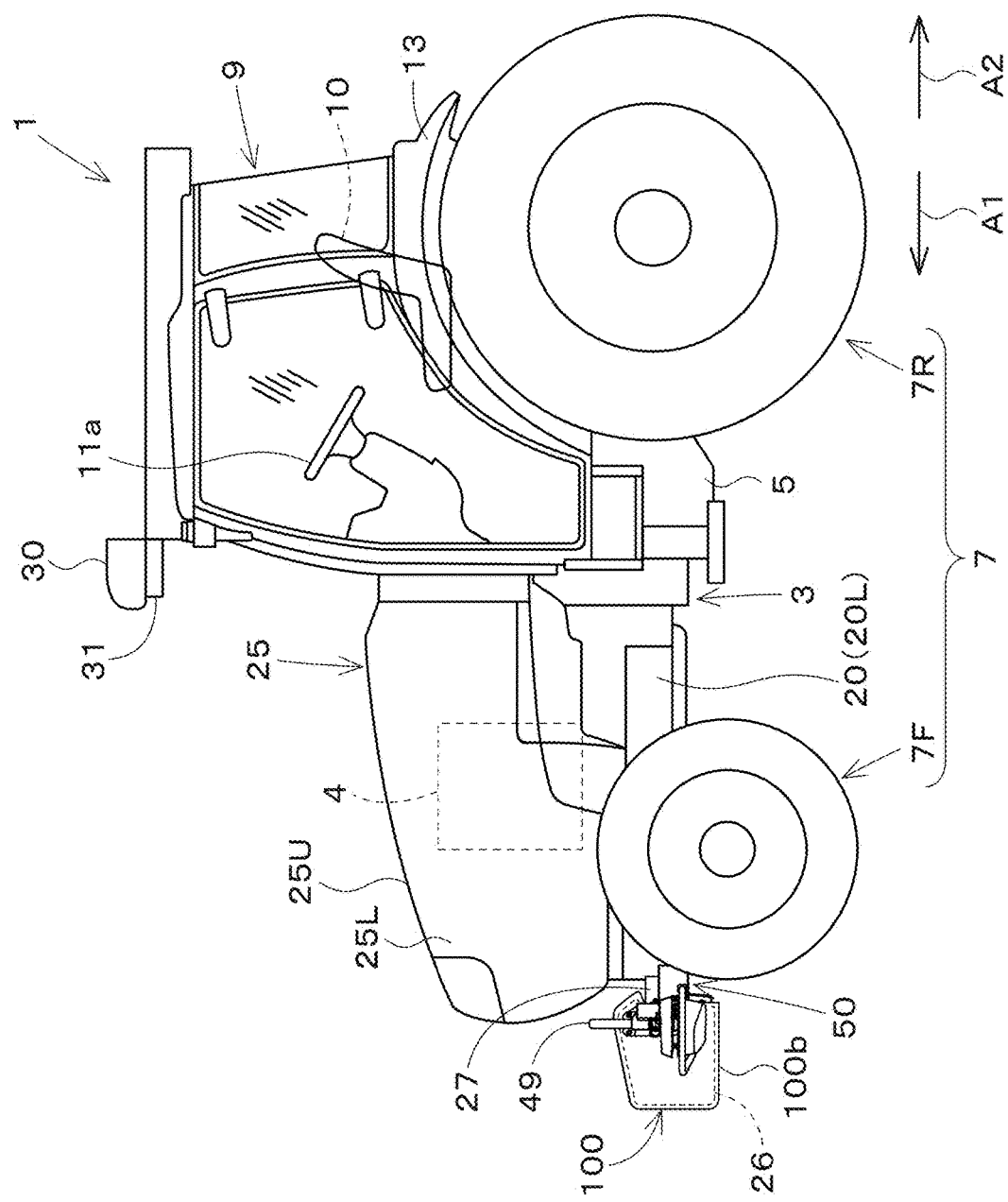
FIG. 2 is an overall side view of the tractor.

FIGS. 1 and 2 illustrate an agricultural machine 1 according to a preferred embodiment of the present invention. In describing the present preferred embodiment, it is assumed that the agricultural machine 1 is a tractor 1. However, the agricultural machine 1 may be, instead of a tractor, another agricultural machine (agricultural vehicle) such as a combine or a rice transplanter, for example.

Hereafter, for convenience of description, the direction of arrow A1 in FIGS. 1 and 2 will be referred to as the forward direction, the direction of arrow A2 will be referred to as the backward direction, the direction of arrow B1 will be referred to as the leftward direction, the direction of arrow B2 will be referred to as the rightward direction, and the direction of arrow D will be referred to as the vehicle-body width direction (or the width direction). A vehicle-body width direction away from a center in the vehicle-body width direction (the direction of arrow D1) will be referred to as the vehicle-body-width outward direction (or the outward direction), and a vehicle-body width direction toward a center in the vehicle-body width direction (the direction of arrow D2) will be referred to as the vehicle-body-width inward direction (or the inward direction).

As illustrated in FIGS. 1 and 2, the tractor 1 includes a vehicle body 3, a prime mover 4, and a transmission 5. A travel device 7 is provided in the vehicle body 3. The travel device 7 supports the vehicle body 3 so that the vehicle body 3 is capable of traveling, and has front wheels 7F and rear wheels 7R. The front wheels 7F and the rear wheels 7R, which are tires in the present preferred embodiment, may be crawlers. The prime mover 4 is an engine (diesel engine, gasoline engine), an electric motor, or the like. The transmission 5 can switch the propelling force of the travel device 7 by speed change, and can switch between forward movement and backward movement of the travel device 7. An operator's seat 10 is provided in the vehicle body 3. The operator's seat 10 is protected by a protector 9. In the present preferred embodiment, the protector 9 is a cabin that protects the operator's seat 10 by surrounding the front, the back, the top, and the sides of the operator's seat 10. However, the protector 9 may be a ROPS or the like that protects the operator's seat 10 by covering at least the top of the operator's seat 10. Fenders 13 are attached to a lower part the protector 9, and the fenders 13 cover upper portions of the rear wheels 7R.

A coupler (not shown), which includes a three-point linkage and the like, is provided in a back portion of the vehicle body 3. A working device (implement or the like) 2 can be removably coupled to the coupler. By coupling the working device 2 to the coupler, the working device 2 can be pulled by the vehicle body 3. The working device 2 may be a cultivator that performs cultivation, a fertilizer spreader that spreads fertilizer, an agricultural chemical spreader that spreads agricultural chemicals, a harvester that performs harvesting, a mower that performs mowing of grass and the like, a tedder that spreads grass and the like, a rake that gathers grass and the like, a baler that forms grass and the like into a bale, or the like.

The vehicle body 3 has a vehicle body frame 20. As illustrated in FIG. 1, the vehicle body frame 20 includes a vehicle body frame 20L provided on the left side and a vehicle body frame 20R provided on the right side. The vehicle body frame 20L and the vehicle body frame 20R each extend forward from the transmission 5 and support a lower portion of the prime mover 4. The vehicle body frame 20L and the vehicle body frame 20R are separated from each other in the vehicle-body width direction. A front end portion of the vehicle body frame 20L and a front end portion of the vehicle body frame 20R are coupled to each other via a front coupling plate 20F. A middle portion of the vehicle body frame 20L and a middle portion of the vehicle body frame 20R are coupled to each other via a middle coupling plate 20M. The vehicle body frame 20L and the vehicle body frame 20R support a front axle case 29. A front axle 15 (see FIG. 6), which rotatably supports the front wheels 7F, is accommodated in the front axle case 29. That is, in the present preferred embodiment, the vehicle body frame 20 is a front axle frame that supports the front axle 15. The vehicle body frame 20 may be a frame that supports a structure other than the front axle case 29 (a frame other than the front axle frame).

Figure 3:
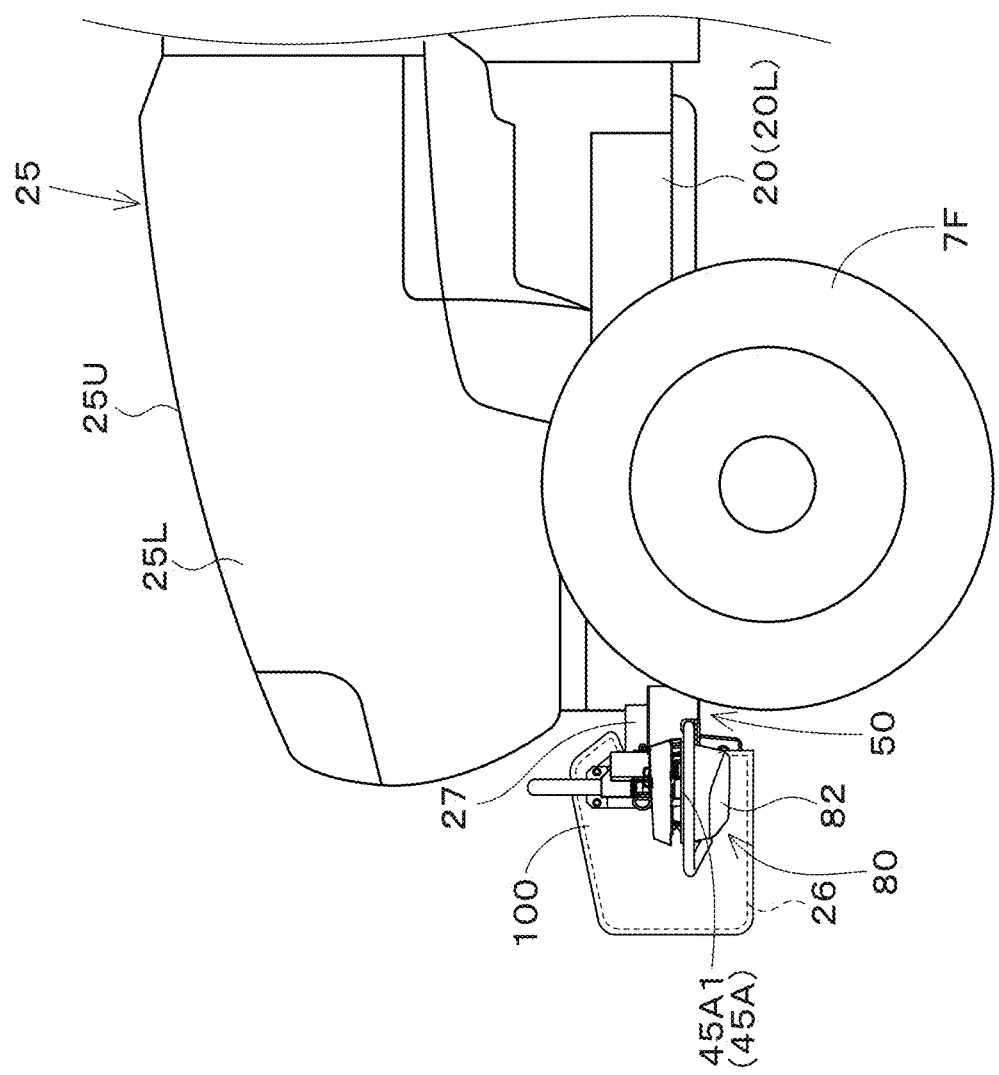
FIG. 3 is an enlarged side view of a front portion of the tractor.

As illustrated in FIGS. 1 to 3, a hood 25 is provided upward of the vehicle body frame 20. The hood 25 extends in the front-back direction along the vehicle body frame 20. The hood 25 is disposed forward of a middle portion of the protector 9 in the width direction. The hood 25 has a left side wall 25L provided on the left side, a right side wall 25R provided on the right side, and an upper wall portion 25U that couples upper portions of the left side wall 25L and the right side wall 25R. An engine room is defined by the left side wall 25L, the right side wall 25R, and the upper wall portion 25U. The prime mover 4, a cooling fan, a radiator, a battery, and the like are accommodated in the engine room. The front wheels 7F are respectively disposed leftward of the left side wall 25L and rightward of the right side wall 25R.

A weight 26 is provided forward of the hood 25, that is, forward of the vehicle body frames 20L and 20R. The weight 26 is attached to a weight bracket (weight attachment portion) 27 provided in a front portion of the vehicle body 3. The weight bracket 27 is attached to the front coupling plate 20F of the vehicle body frame 20L by using a fastener such as a bolt. The periphery of the weight 26 is covered by a weight cover 100.

Figure 6:
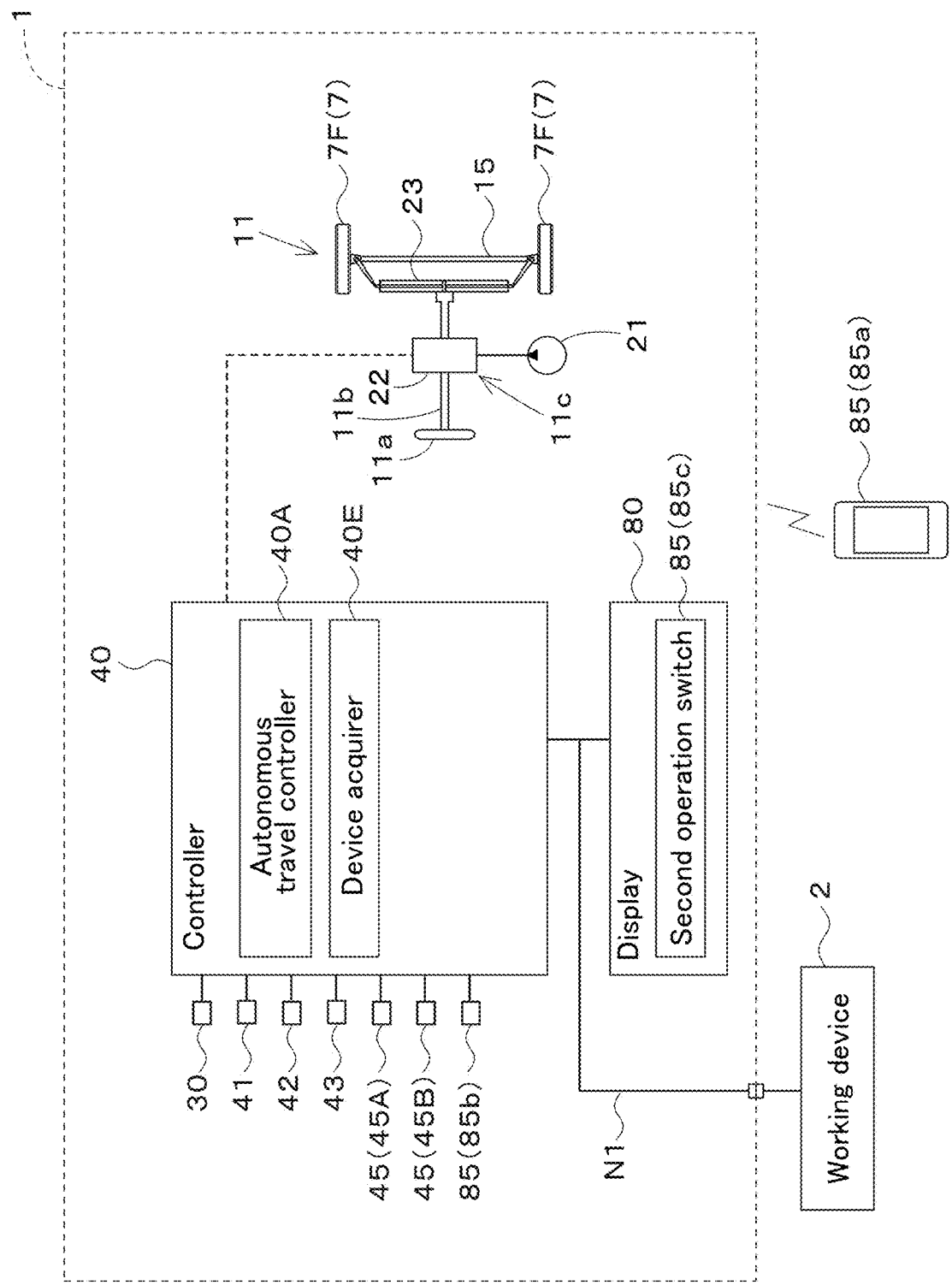
FIG. 6 is a block diagram of a control system of the tractor.

As illustrated in FIG. 6, the tractor 1 includes a steering device 11. The steering device 11 has a steering wheel 11*a*, a rotary shaft (steering shaft) 11*b* that rotates as the steering wheel 11*a* rotates, and an assist mechanism (power steering mechanism) 11*c* that assists in steering of the steering wheel 11*a*. The assist mechanism 11*c* includes a hydraulic pump 21, a control valve 22 to which a hydraulic fluid delivered from the hydraulic pump 21 is supplied, and a steering cylinder 23 that is activated by the control valve 22. The control valve 22 is a solenoid valve that is activated based on a control signal. The control valve 22 is, for example, a three-position switching valve that is switchable by movement of a spool or the like. The control valve 22 is switchable also by steering of the steering shaft 11*b*. The steering cylinder 23 is connected to arms (knuckle arms; reference sign omitted) that change the orientation of the front wheels 7F.

Accordingly, when the steering wheel 11*a* is operated, the switching position and the opening of the control valve 22 are switched in accordance with the steering wheel 11*a*, the steering cylinder 23 extends leftward or rightward in accordance with the switching position and the opening of the control valve 22, and thus the steering direction of the front wheels 7F can be changed. The steering device 11 described above is an example, and the configuration of the steering device 11 is not limited to the configuration described above.

As illustrated in FIGS. 1 and 2, the tractor 1 includes a position detector 30. The position detector 30 is attached to a front portion of the top panel of the protector 9 via a mounter 31. However, the attachment position of the position detector 30 is not limited to the position illustrated in the figures, and the position detector 30 may be attached onto the top panel of the protector 9 or may be attached to another portion of the vehicle body 3. The position detector 30 may be attached to the working device 2, such as a cultivator.

The position detector 30 is a device that detects the position thereof (measured position including latitude and longitude) by using a satellite positioning system. That is, the position detector 30 receives signals (positions of positioning satellites, transmission time, correction information, and the like) transmitted from the positioning satellites, and detects the position (latitude, longitude) based on the received signals. The position detector 30 may detect, as the position (latitude, longitude) thereof, a corrected position that is corrected based on a correction signal and the like from a base station (reference station) that can receive signals from the positioning satellites. Alternatively, the position detector 30 may have an inertial measurement unit such as a gyroscope sensor or an acceleration sensor, and may detect, as the position thereof, a position corrected by the inertial measurement unit. With the position detector 30, it is possible to detect the position (travel position) of the vehicle body 3 of the tractor 1.

As illustrated in FIG. 1, the tractor 1 includes a plurality of obstacle detectors 45. Each of the plurality of obstacle detectors 45 can detect an object, that is, an obstacle that is present around the tractor 1. At least one of the plurality of obstacle detectors 45 is provided forward of the protector 9 and outward of the hood 25. That is, at least one obstacle detector 45 is disposed, in a region forward of the protector 9 of the tractor 1, in a region further leftward than the left side wall 25L of the hood 25 or a region further rightward than the right side wall 25R of the hood 25. In the present preferred embodiment, the plurality of obstacle detectors 45 include an obstacle detector 45L provided on the left side of the vehicle body 3 (on the left side of the hood 25) and an obstacle detector 45R provided on the right side of the vehicle body 3 (the right side of the hood 25).

The obstacle detectors 45 are provided forward of the front wheels 7F and farther outward than the front wheels 7F. The obstacle detector 45L is provided forward of the left front wheel 7F and farther outward (leftward) than the left front wheel 7F. The obstacle detector 45R is provided forward of the right front wheel 7F and farther outward (rightward) than the right front wheel 7F. In other words, the obstacle detector 45L is provided leftward and forward of the left front wheel 7F, and the obstacle detector 45R is provided rightward and forward of the right front wheel 7F.

Figure 9:
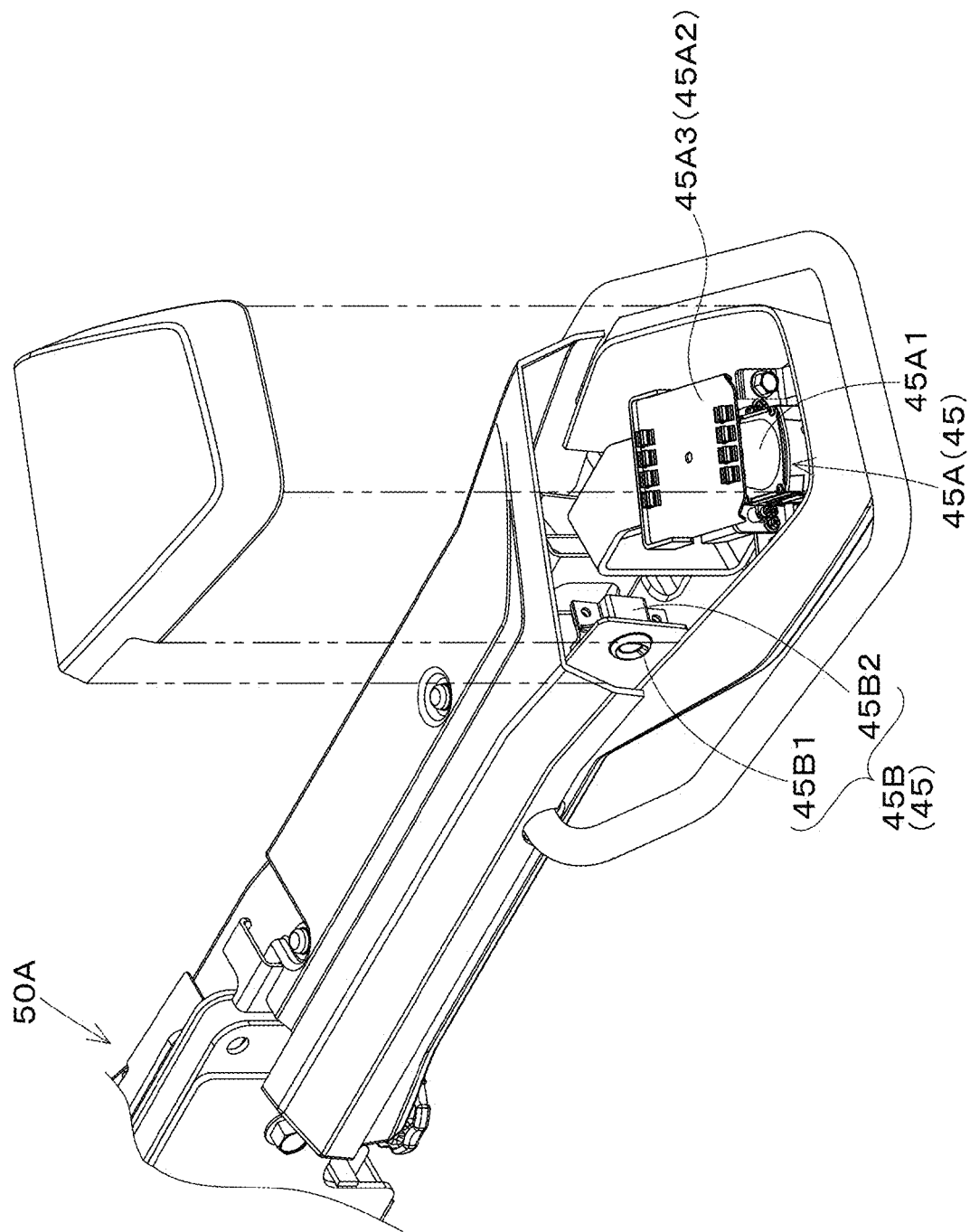
FIG. 9 is a perspective view illustrating a state in which a separable cover is removed from a cover body.

The obstacle detector 45 is a laser scanner 45A, a sonar 45B, and the like. The laser scanner 45A detects an object (obstacle) by emitting laser light as a detection wave. The laser scanner 45A detects the distance to an obstacle based on the time from emission to receipt of laser light. As illustrated in FIG. 9, the laser scanner 45A includes a light emitter/receiver 45A1 and a housing 45A2. The light emitter/receiver 45A1 emits laser light and receives the emitted laser light reflected by an obstacle (reflected light). That is, the light emitter/receiver 45A1 includes an emission portion that emits laser light (detection wave) and a receiving portion that receives the laser light (detection wave) reflected by an obstacle. The housing 45A2 is a case that accommodates and holds the light emitter/receiver 45A1. The housing 45A2 includes an upper body 45A3 disposed upward of the light emitter/receiver 45A1 and a lower body (not shown) disposed downward of the light emitter/receiver 45A1. All or part of the space between the upper body 45A3 and the lower body, that is, the periphery of the light emitter/receiver 45A1 is open, and laser light (detection wave) can pass therethrough.

The sonar 45B detects an object (obstacle) by emitting a sound wave as a detection wave. As illustrated in FIG. 9, the sonar 45B includes a sound emitter/receiver 45B1 and a housing 45B2. The sound emitter/receiver 45B1 emits a sound wave and receives the emitted sound wave reflected by an obstacle. That is, the sound emitter/receiver 45B1 includes an emission portion that emits a sound wave (detection wave) and a receiving portion that receives the sound wave (detection wave) reflected by an obstacle. The housing 45B2 is a case that accommodates and holds the sound emitter/receiver 45B1. The sonar 45B detects the distance to an obstacle based on the time from emission to receipt of a sound wave.

As illustrated in FIG. 1, the laser scanner 45A and the sonar 45B are disposed forward of the front wheel 7F and outward of the front wheel 7F. To be more specific, at least the receiving portions (the light emitter/receiver 45A1 and the sound emitter/receiver 45B1) of the laser scanner 45A and the sonar 45B are disposed forward of the front wheel 7F and outward of the front wheel 7F.

Figure 4:
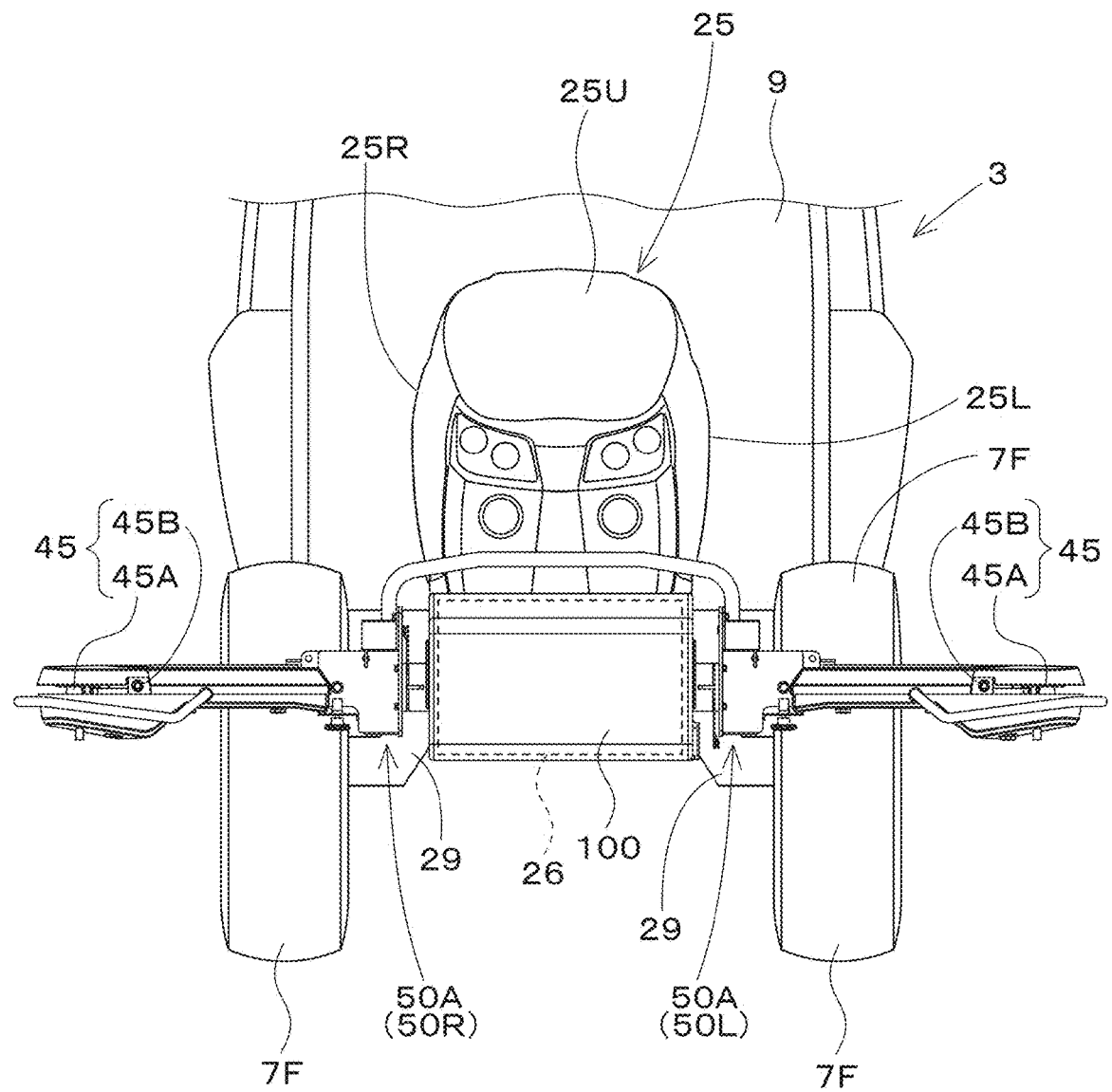
FIG. 4 is a front view of the tractor when an obstacle detector is in a detection position.

As illustrated in FIG. 4, the laser scanner 45A and the sonar 45B are set at positions that are farther downward than the upper wall portion 25U of the hood 25 and lower than an upper end portion of the front wheel 7F. Therefore, the light emitter/receiver 45A1 of the laser scanner 45A and the sound emitter/receiver 45B1 of the sonar 45B are also set at positions that are farther downward than the upper wall portion 25U of the hood 25 and are lower than the upper end portion of the front wheel 7F. The laser scanner 45A (the light emitter/receiver 45A1) and the sonar 45B (the sound emitter/receiver 45B1) are positioned farther downward than the upper end portion of the front wheel 7F and further upward than the front axle 15.

As illustrated in FIGS. 1 and 4, the laser scanner 45A is disposed farther outward than the sonar 45B. To be specific, as illustrated in FIG. 1, in a state in which the front wheel 7F is positioned to move the vehicle body 3 straight (a state in which the steering wheel 11a is not steered), the laser scanner 45A (the light emitter/receiver 45A1) is disposed farther outward than an imaginary line X1 that is positioned outward by the width of the front wheel 7F (tread width) from an outer end of the front wheel 7F in the width direction. The sonar 45B is disposed farther inward than the imaginary line X1.

Figure 5:
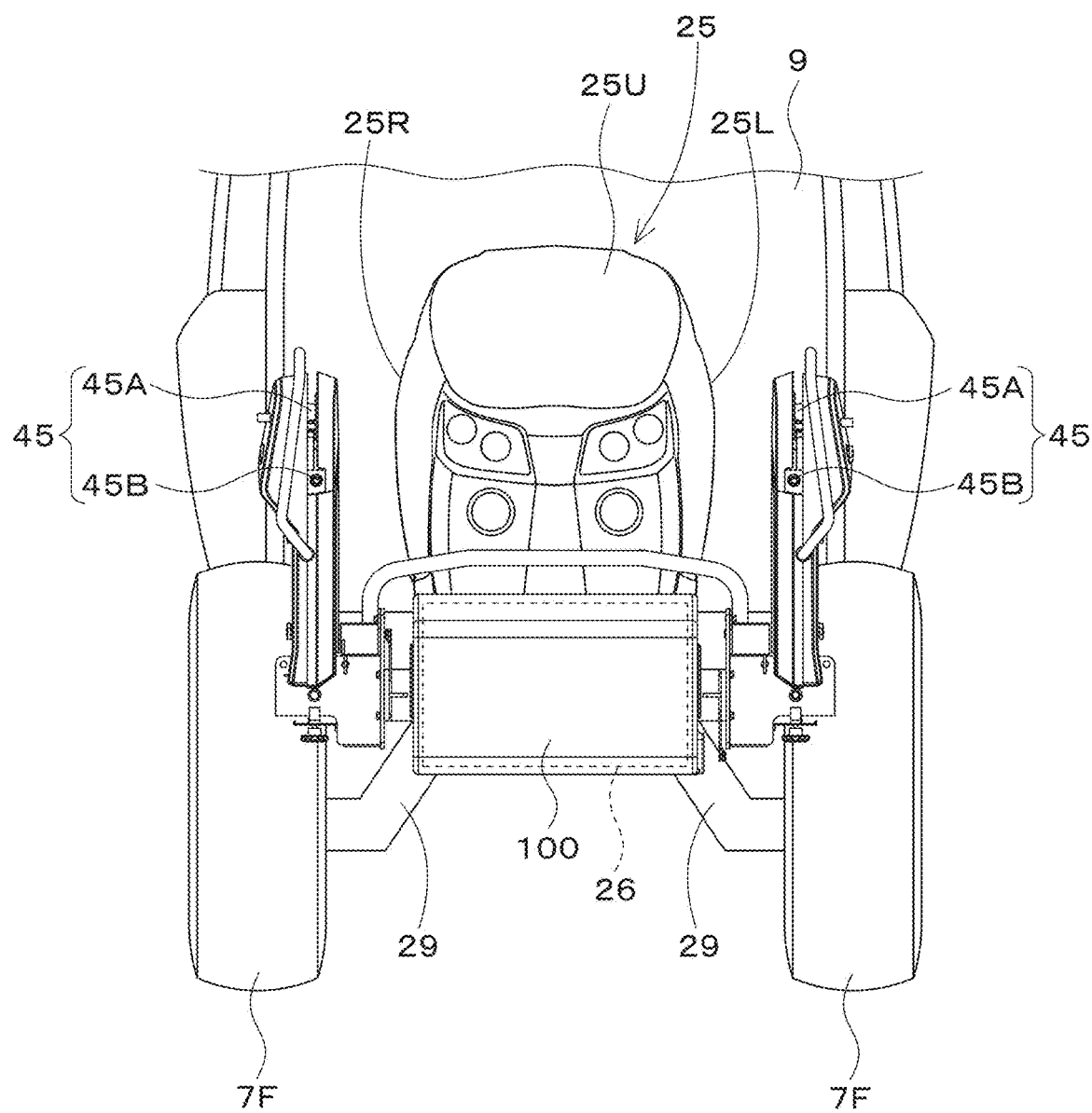
FIG. 5 is a front view of the tractor when the obstacle detector is in a retracted position.
Figure 7:
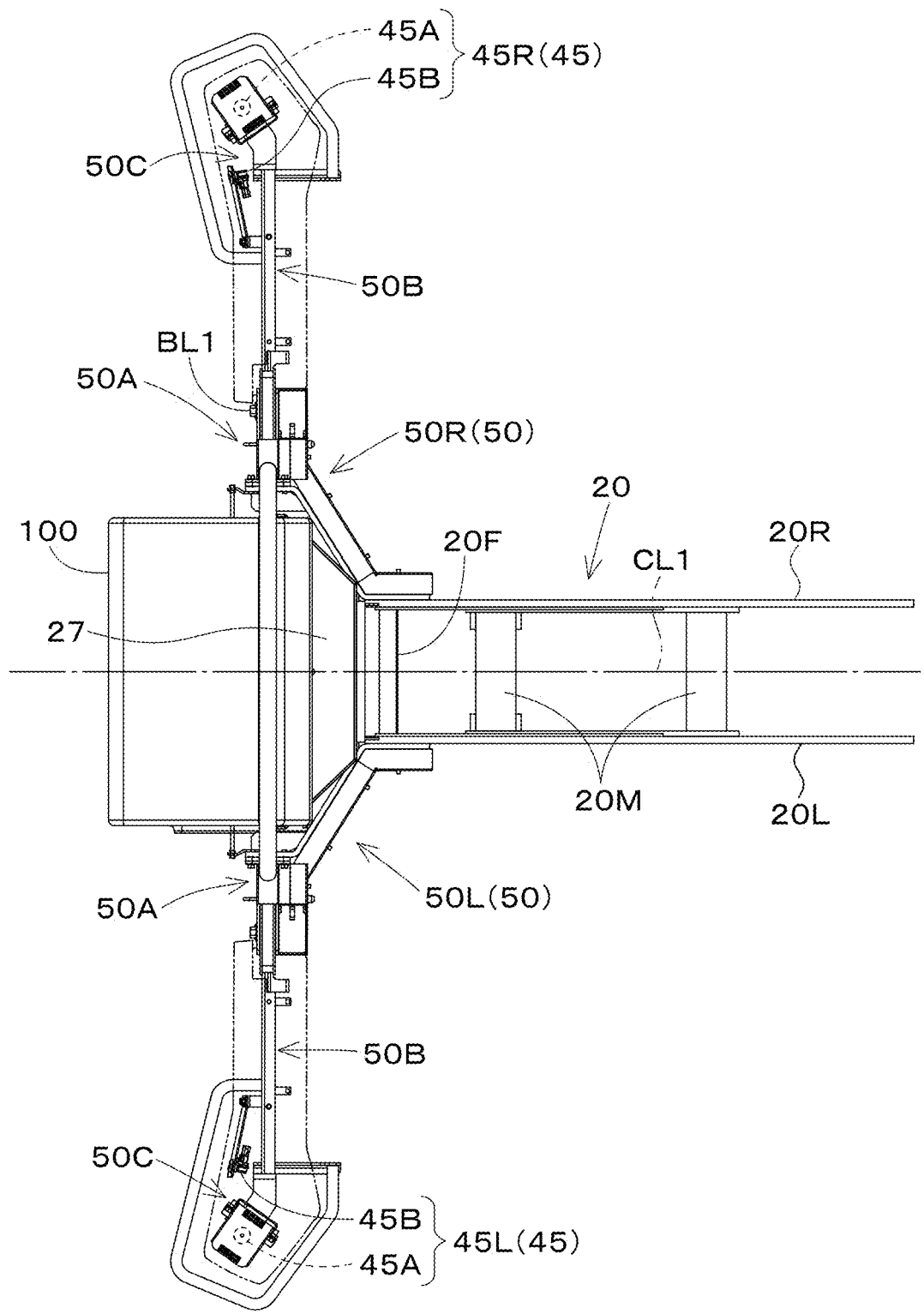
FIG. 7 is a plan view illustrating a cover by an imaginary line when the obstacle detector is in the detection position.
Figure 8:
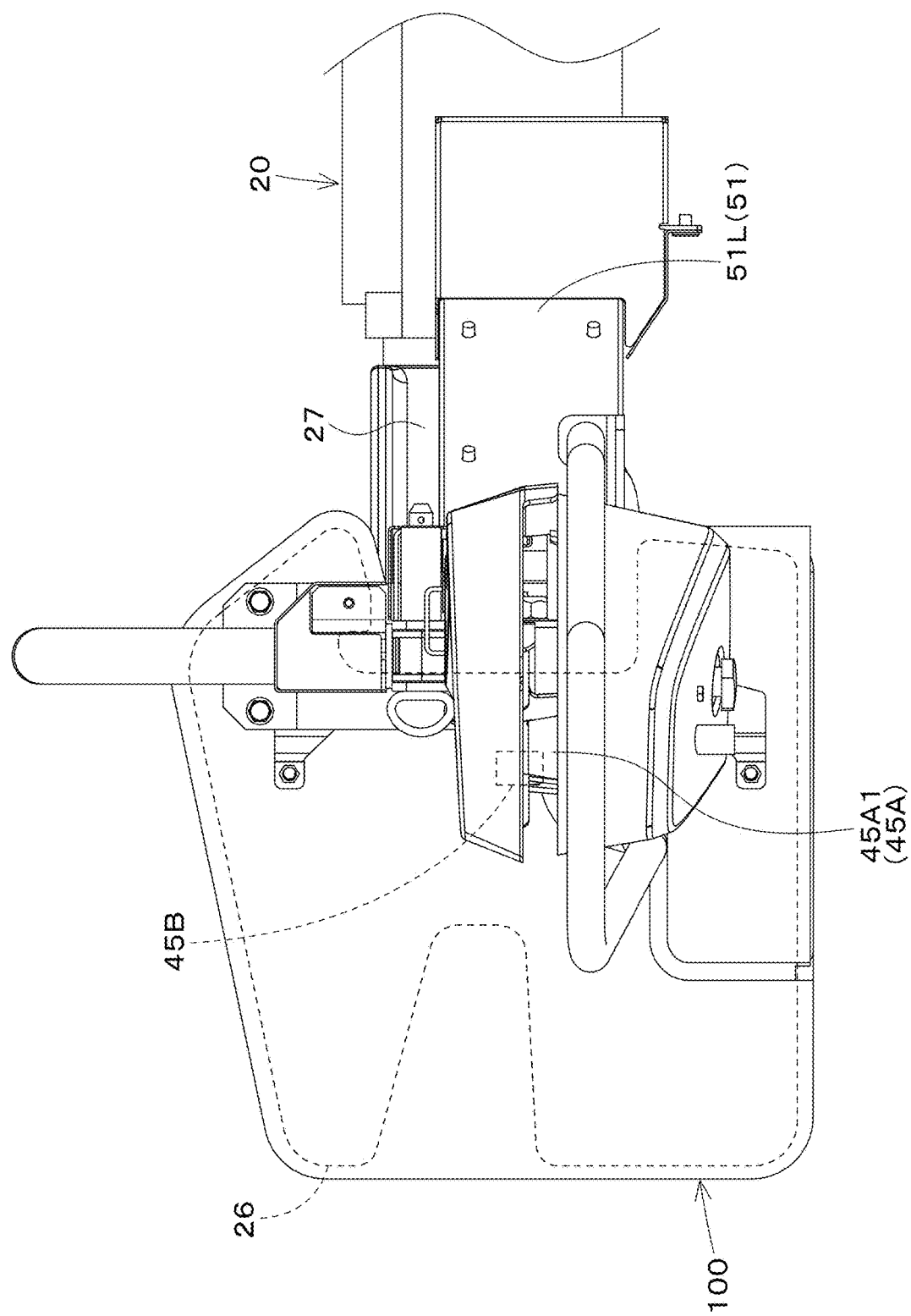
FIG. 8 is a side view of a front portion of the tractor when the obstacle detector is in the detection position.

As illustrated in FIG. 7, the obstacle detector 45 is supported by the vehicle body 3 via a support member 50. The support member 50 can change the position of the obstacle detector 45 to a detection position (FIG. 4) and a retracted position (FIG. 5). The support member 50 includes a support member 50L that supports the obstacle detector 45 leftward of the vehicle body 3 and a support member 50R that supports the obstacle detector 45 rightward of the vehicle body 3. The support member 50L and the support member 50R have the same configuration except that they are symmetric to each other about a center line CL1 in the vehicle-body width direction. The support member 50 extends outward from the vehicle body frame (front axle frame) 20. To be specific, the support member 50L extends leftward from the vehicle body frame 20L. The support member 50R extends rightward from the vehicle body frame 20R. Thus, the obstacle detector 45 is positioned forward from the front wheel 7F, and can detect an obstacle that is leftward and forward of the vehicle body 3.

As illustrated in FIG. 6, the tractor 1 includes a controller 40 and a display 80. The controller 40 includes a CPU, an electric circuit, an electronic circuit, and the like, and controls the tractor 1 in various ways. The display 80 has a liquid crystal panel, an organic EL panel, or the like, and displays information about various types.

A state detector 41, which detects a driving state and the like of the tractor 1, and an ignition switch 42 are connected to the controller 40.

The state detector 41 is, for example, a device that detects a state of a travel system or the like, and detects, for example, states of a crank sensor, a cam sensor, an engine rotation sensor, an accelerator sensor, a vehicle speed sensor, a steering angle sensor, the position detector 30, and the like. The state detector 41 may be a device that detects a state of a portion other than the travel system, such as elevation lever detection sensor, a PTO rotation detection sensor, or the like.

The ignition switch 42 is a switch that is set around the operator's seat 10 and that an operator can operate. The ignition switch 42 is a switch that is switchable between ON and OFF. When the ignition switch 42 is ON, the prime mover 4 is driven, and, when the ignition switch 42 is OFF, the prime mover 4 is stopped being driven. The ignition switch 42 may include an accessory switch to supply electric power to electric components. In this case, the ignition switch 42 is switchable between a first ON-position for driving the prime mover 4, a second ON-position for supplying electric power to electric components, and an OFF-position.

The controller 40 performs control of the travel system of the tractor 1 and control of the working system of the tractor 1. The controller 40 controls, for example, the engine rotation speed, the vehicle speed, the steering angle of the steering device 11, and the like based on a detection state detected by the state detector 41. The controller 40 performs control of autonomous travel based on a detection state detected by the state detector 41. To be specific, the controller 40 includes an autonomous travel controller 40A. The autonomous travel controller 40A includes an electric/electronic circuit provided in the controller 40, a program stored in the controller 40, and the like.

Figure 10:
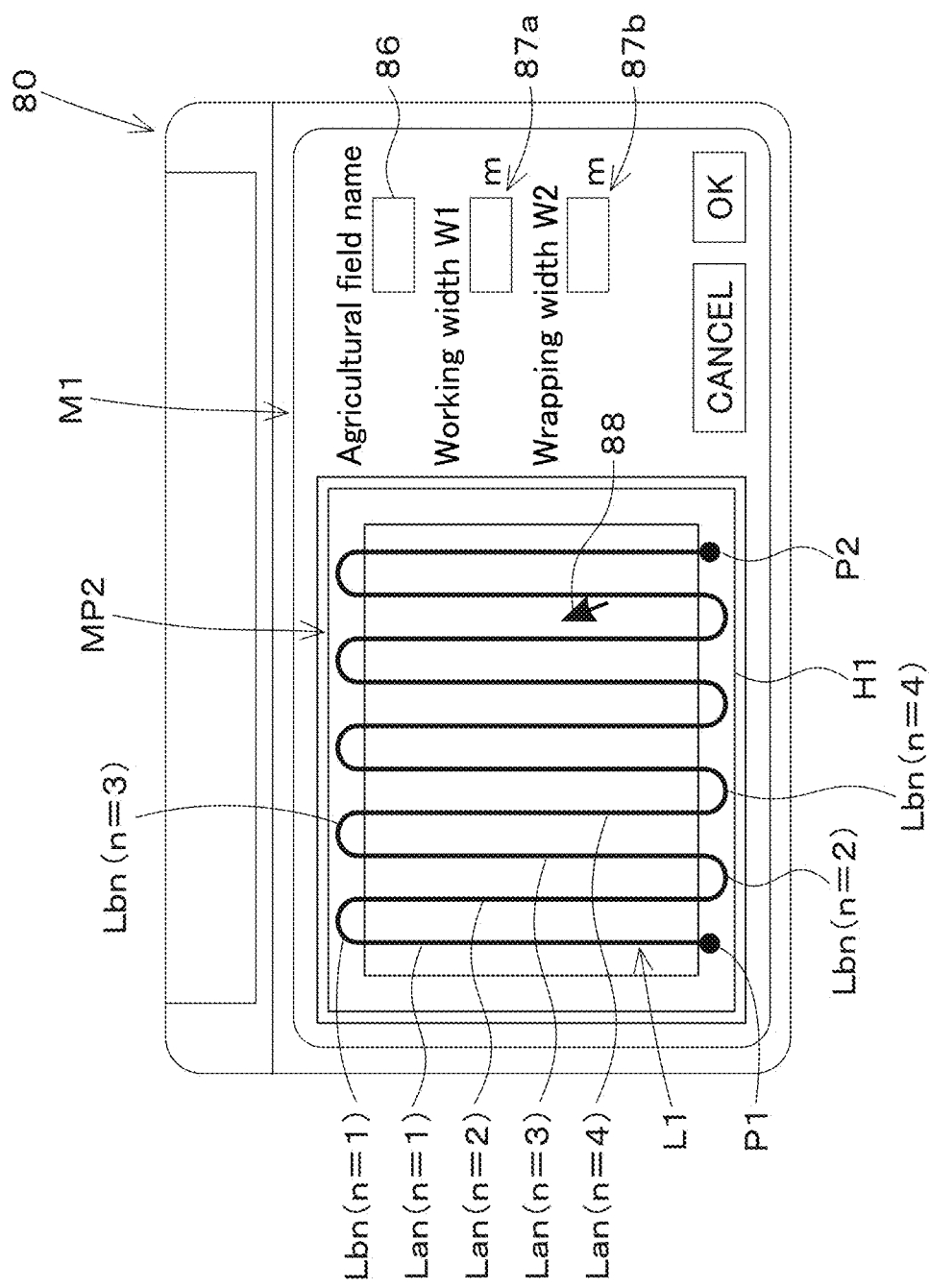
FIG. 10 illustrates an example of a creation screen.

In performing autonomous travel, as illustrated in FIG. 10, a travel route (planned travel line) L1 is created by using the display 80 and the like. First, creation of the planned travel line L1 will be described.

As illustrated in FIG. 10, when an operator or the like performs a predetermined operation on the display 80, the display 80 displays a creation screen M1 for creating the planned travel line L1. For example, when a predetermined agricultural field name is input to an agricultural-field input interface 86 of the creation screen M1, the display 80 displays an agricultural field map input to the agricultural-field input interface 86 (agricultural field map MP2), that is, a map of an agricultural field H1 input to the agricultural-field input interface 86 as an agricultural field map MP2 on the creation screen M1. By performing a predetermined operation on the display 80, the operator or the like can create a travel route (planned travel line) L1 of the vehicle body 3 on the agricultural field map MP2. In creating the planned travel line L1, for example, in the agricultural field map MP2, it is possible to create, as the planned travel line L1, straight movement portions Lan (n=1, 2, 3, . . . , n) representing straight movements and turning portions Lbn (n=1, 2, 3, . . . , n) representing turns. For example, in the creation screen M1, when a working width W1 is input to a working-width input interface 87a and a wrapping width W2 is input to a wrapping-width input interface 87b, the display 80 calculates the distance K1 (K1=W1−2×W2) between straight movement portions Lan and sets a plurality of straight movement portions Lan in the agricultural field H1 at intervals K1. When a plurality of straight movement portions Lan are selected, the display 80 sets turning portions Lbn that connect end portions of adjacent straight movement portions Lan, among the plurality of straight movement portions Lan. The number of the straight movement portions Lan may be set to any appropriate number.

When a predetermined position on the planned travel line L1 displayed on the creation screen M1 is selected by using a pointer 88, the display 80 sets the selected predetermined position as a start position P1 or an end position P2. That is, with the display 80, it is possible to set (create) the planned travel line L1 (the plurality of straight movement portions Lan, the plurality of turning portions Lbn, the start position P1, the end position P2) for performing autonomous travel in the agricultural field H1. A planned travel line L1 created by using an external apparatus such as a server may be acquired by the tractor 1 and displayed on the display 80.

When creation of the planned travel line L1 is complete and a command to start autonomous travel is issued, the autonomous travel controller 40A performs control (autonomous travel control) of autonomous travel. As illustrated in FIG. 6, the command to start autonomous travel is issued by using a travel switch 85.

The travel switch 85 is a switch that commands starting of autonomous travel of the vehicle body 3 when operated. The travel switch 85 is a terminal (a mobile terminal, a tablet, or the like) 85a that has a function of issuing a command to start (start command) by a remote operation, a first operation switch 85b that is set around the operator's seat of the tractor 1 and that issues a start command due to an operation by an operator, a second operation switch 85c that issues a start command due to selection of a symbol mark displayed on the display 80, and the like. The travel switch 85 may be a switch that can command interruption or finish of autonomous travel of the vehicle body 3 when operated.

In autonomous travel control, the autonomous travel controller 40A sets the switching position and the opening of the control valve 22 so that at least the travel position (position detected by the position detector 30) of the vehicle body 3 coincides with a predetermined travel route (travel path), that is, so that the vehicle body 3 coincides with the planned travel line L1. In other words, the controller 40 sets the movement direction and the movement distance of the steering cylinder 23 (the steering direction and the steering angle of the front wheels 7F) so that the travel position of the tractor 1 coincides with the planned travel line L1.

To be specific, the autonomous travel controller 40A compares the travel position of the vehicle body 3 with a position indicated by the planned travel line L1 (planned travel position). When the travel position coincides with the planned travel position, the autonomous travel controller 40A does not change and holds the steering angle and steering direction of the steering wheel 11a of the steering device 11 (the steering angle and the steering direction of the front wheels 7F) (does not change and maintains the opening and the switching position of the control valve 22). When the travel position does not coincide with the planned travel position, the autonomous travel controller 40A changes the steering angle and/or the steering direction of the steering wheel 11a of the steering device 11 (changes the opening and/or the switching position of the control valve 22) so that the difference (displacement) between the travel position and the planned travel position becomes zero.

In the preferred embodiment described above, in autonomous travel control, the autonomous travel controller 40A changes the steering angle of the steering device 11 based on the difference between the travel position and the planned travel position. If the orientation of the planned travel line L1 differs from the orientation (vehicle-body orientation) of the movement direction (travel direction) of the tractor 1 (the vehicle body 3), the autonomous travel controller 40A may set the steering angle so that the vehicle-body orientation coincides with the orientation of the planned travel line L1. In autonomous travel control, the autonomous travel controller 40A may set the final steering angle in autonomous travel control based on a steering angle obtained based on the difference (positional deviation) and a steering angle obtained based on an orientational deviation. The steering angle may be set by using a method different from the aforementioned method of setting the steering angle in autonomous travel control.

In autonomous travel control, the autonomous travel controller 40A may control the rotation speed of the travel device 7, that is, the front wheels 7F and/or the rear wheels 7R so that the actual vehicle speed of the tractor 1 (the vehicle body 3) coincides with a vehicle speed corresponding to a predetermined planned travel line L1.

The autonomous travel controller 40A controls autonomous travel based on the detection result of detecting an obstacle by the obstacle detector 45. For example, the autonomous travel controller 40A continues autonomous travel when the obstacle detector 45 is not detecting an obstacle, and stops autonomous travel when the obstacle detector 45 detects an obstacle. To be more specific, when the obstacle detector 45 detects an obstacle, the autonomous travel controller 40A stops autonomous travel by stopping travel of the tractor 1 if the distance between the obstacle and the tractor 1 is less than or equal to a predetermined threshold (stop threshold).

During autonomous travel, the autonomous travel controller 40A continues autonomous travel when a seat-occupation detector 43 is detecting that the operator's seat is occupied and stops autonomous travel when the seat-occupation detector 43 detects that the operator's seat is not occupied.

Figure 11:
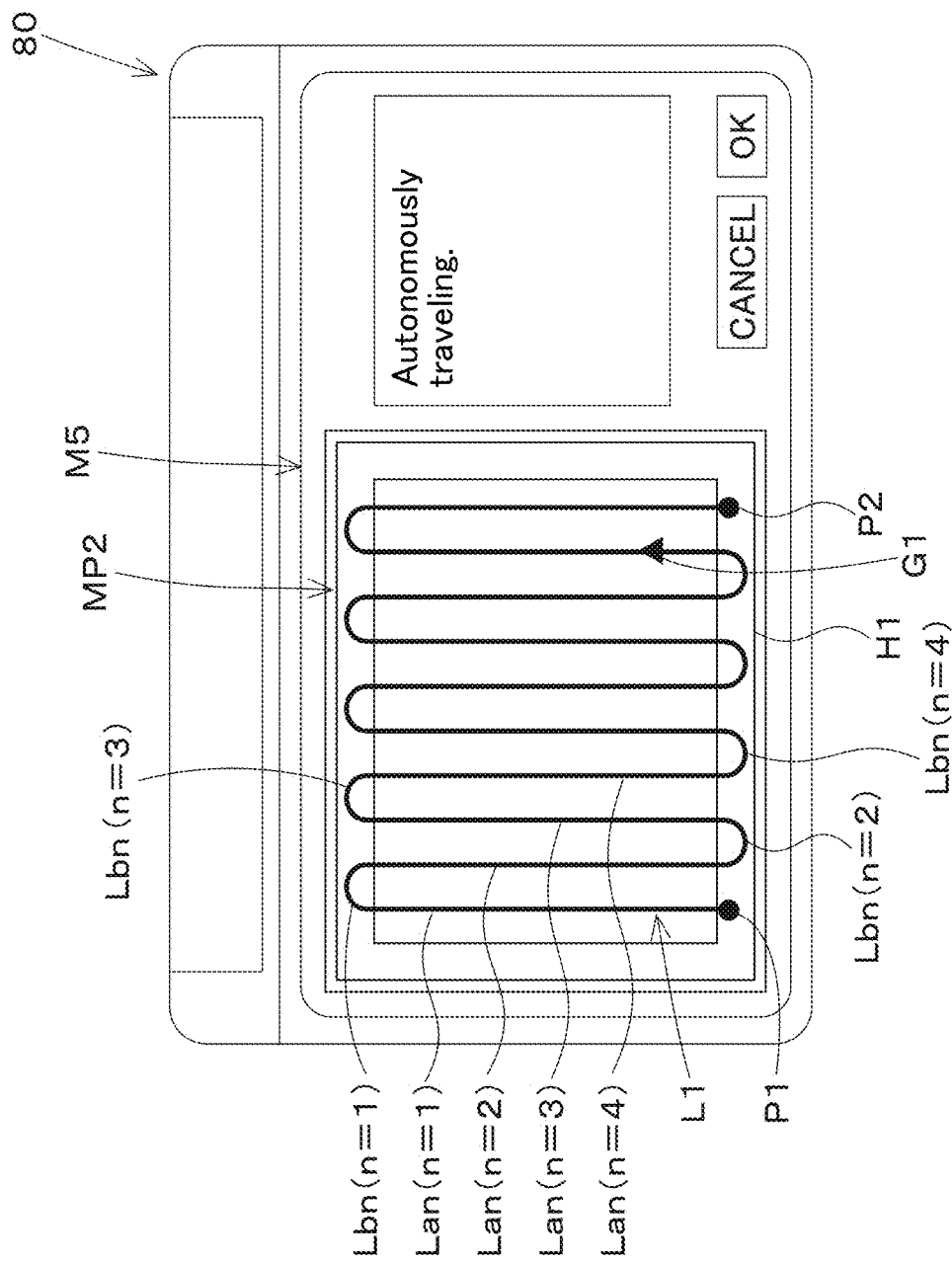
FIG. 11 illustrates an example of a drive screen.

As illustrated in FIG. 11, the display 80 displays a drive screen M5 during autonomous travel (when autonomous travel is being performed). In the drive screen M5, a figure G1 representing the tractor 1 (the vehicle body 3) and the planned travel line L1 are displayed.

Figure 12A:
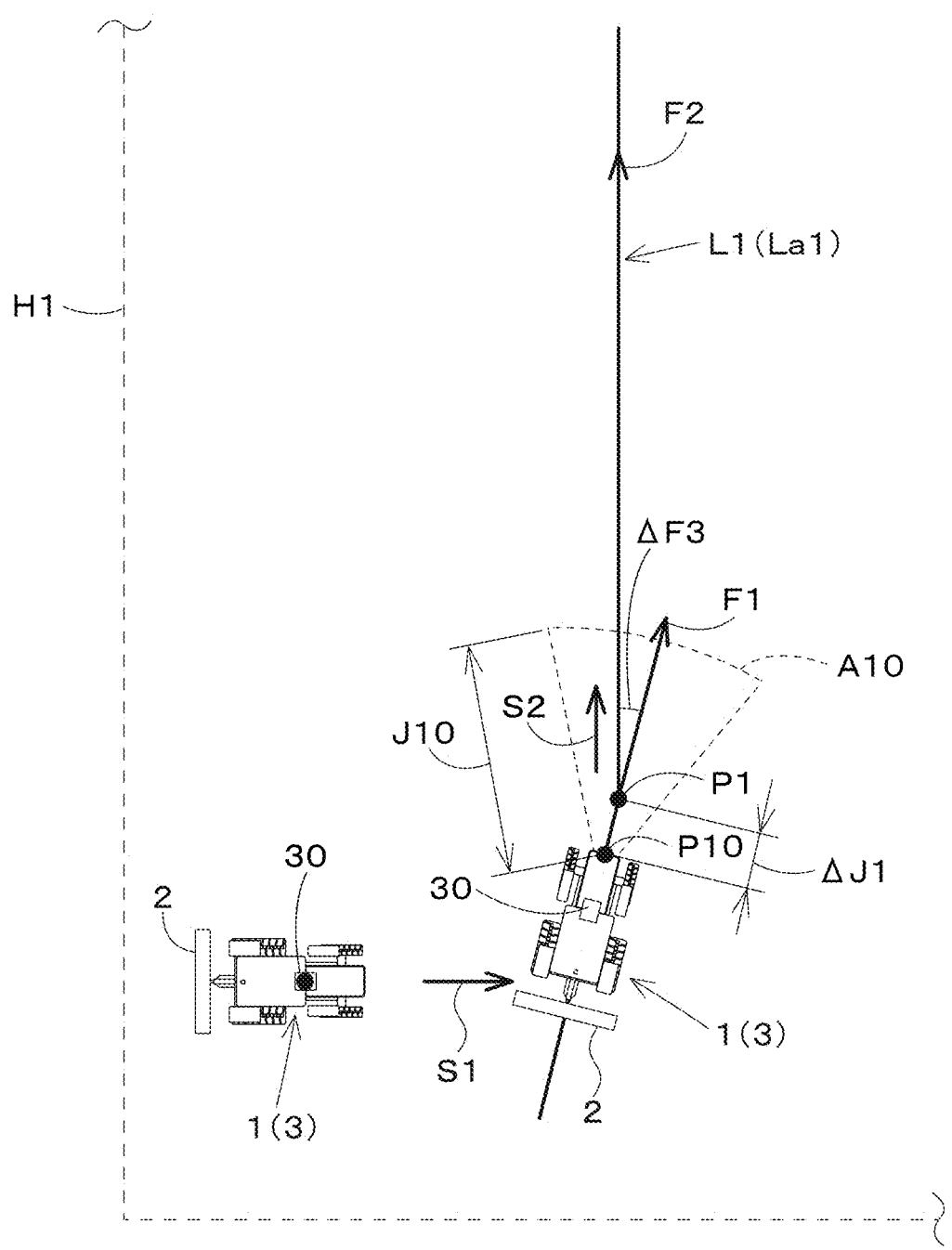
FIG. 12A illustrates an example of a state before autonomous travel is started.

As illustrated in FIG. 12A, in order to perform unmanned autonomous travel in the agricultural field H1. First, an operator enters the tractor 1 and moves the tractor 1 (the vehicle body 3) toward the start position P1 by manual operation (manual travel). When the tractor 1 (the vehicle body 3) reaches the start position P1, the operator exits the tractor 1 (S1). At the start position P1, when the operator or the like, who has exited the tractor 1 in a state in which a travel start condition is satisfied, operates the travel switch 85 and thus a start command is input to the controller 40 (the autonomous travel controller 40A), the autonomous travel controller 40A starts autonomous travel (S2).

The travel start condition is a condition for determining whether the present position and the like of the tractor 1 (the vehicle body 3) are suitable for starting autonomous travel. As illustrated in FIG. 12A, if the positional deviation $\Delta J1$ between a predetermined position (reference point) P10 in the tractor 1 (the vehicle body 3) and the planned travel line L1 is less than or equal to a threshold J10 (for example, less than or equal to 5 m) and the orientational deviation $\Delta F3$ between the vehicle-body orientation F1 of the tractor 1 (the vehicle body 3) and the orientation F2 of the planned travel line L1 is less than or equal to a threshold F10 (for example, less than or equal to 20° (deg)), the controller 40 (the autonomous travel controller 40A) determines that the travel start condition is satisfied. If the positional deviation $\Delta J1$ is greater than the threshold J10 (for example, greater than 5 m) or the orientational deviation $\Delta F3$ is greater than the threshold F10 (for example, greater than 20° (deg)), the controller 40 determines that the travel start condition is not satisfied.

As illustrated in FIG. 12A, the positional deviation $\Delta J1$, which is used to determine whether the travel start condition is satisfied, is the distance between the tractor 1 (the vehicle body 3) and the planned travel line L1 in the movement direction (the vehicle-body orientation F2) of the tractor 1 (the vehicle body 3), and is represented by an arc-shaped range (with a center angle of 20° deg) A10 around a reference point P10 at the front end of the tractor 1 (the vehicle body 3). That is, when an arc having a radius of 5 m from the reference point P10 is drawn, if the planned travel line L1 is within the arc-shaped range A10, the controller 40 (the autonomous travel controller 40A) determines that the positional deviation $\Delta J1$ is less than or equal to 5 m. The reference point P10 can be obtained by adding the distance to the front end of the tractor 1 to a travel position detected by the position detector 30 or subtracting the distance from the travel position.

Figure 12B:
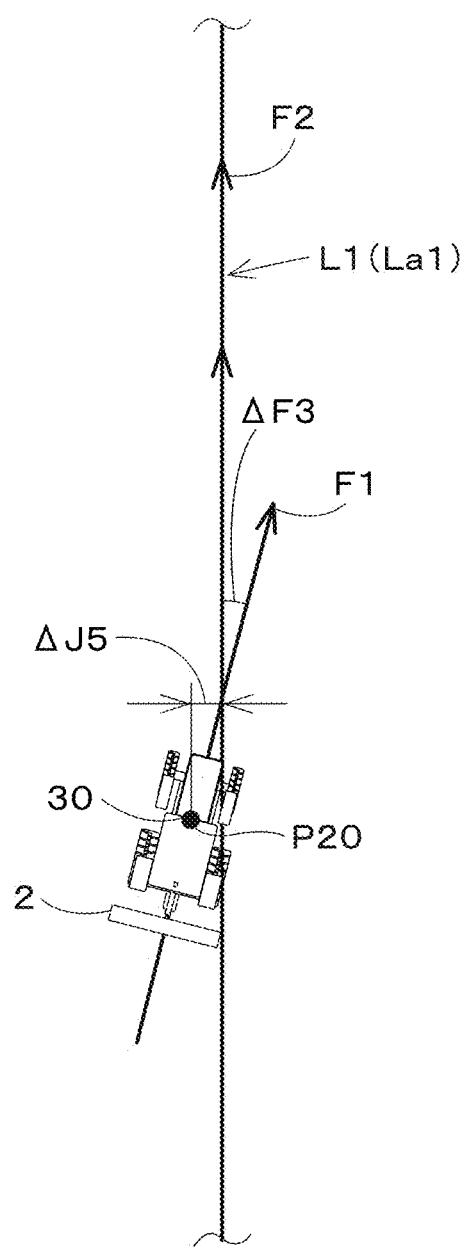
FIG. 12B illustrates an example of a state when autonomous travel is being performed.

As illustrated in FIG. 12B, after starting autonomous travel, the autonomous travel controller 40A performs adjustment of steering and the vehicle speed so that the positional deviation $\Delta J5$ between the travel position P20 of the tractor 1 (the vehicle body 3) and the planned travel line L1 in the width direction becomes less than or equal to a threshold. Moreover, the autonomous travel controller 40A performs setting (adjustment) of the steering angle and the vehicle speed so that the orientational deviation $\Delta F3$ between the vehicle-body orientation F1 of the tractor 1 (the vehicle body 3) and the orientation F2 of the planned travel line L1 becomes less than or equal to a threshold.

Figure 12C:
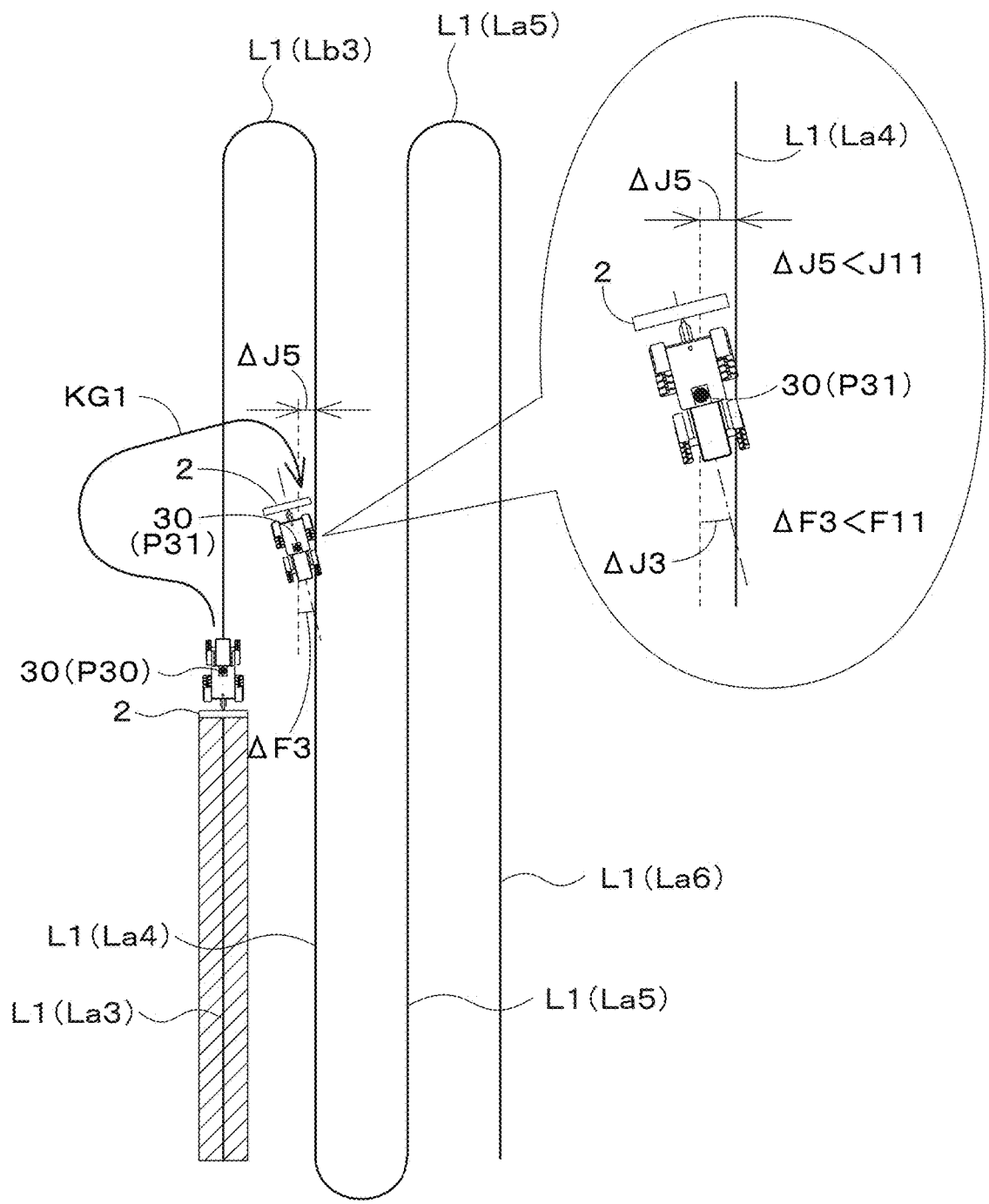
FIG. 12C illustrates an example of a state in which manual travel is performed after interrupting autonomous travel.

When autonomous travel is being performed, it is possible to interrupt autonomous travel by operating the travel switch 85. As illustrated in FIG. 12C, after interrupting autonomous travel and an operator has entered the tractor 1, the operator can move the tractor 1 to another place by manual travel. For example, as represented by a path KG1 in FIG. 12C, after interrupting autonomous travel at a position P30 in the middle of the third straight movement portion La3, it is possible to move the tractor 1 from the position P30 to another place. Here, when restarting autonomous travel, a place where restarting is to be performed, that is, any position in the planned travel line L1 is selected. To be specific, as illustrated in FIG. 11, the operator selects, from the plurality of straight movement portions Lan displayed on the display 80, a predetermined straight movement portion Lan where the operator wants to restart autonomous travel. The operator manually drives the tractor 1 (the vehicle body 3) toward the selected predetermined straight movement portion Lan (selected straight movement portion) Lan to move the tractor 1 to a place around the selected predetermined straight movement portion Lan. When the tractor 1 (the vehicle body 3) reaches the place around the selected straight movement portion Lan, the operator stops the tractor 1 and exits the tractor 1.

For example, as illustrated in FIG. 12C, in a situation in which the tractor 1 is positioned at a position (stop-exit position) P31 where the tractor 1 was stopped and the operator exited the tractor 1, when the operator issues a start command by operating the travel switch 85, the autonomous travel controller 40A determines whether or not the travel start condition is satisfied. For example, when the selected straight movement portion Lan is the fourth straight movement portion La4, the autonomous travel controller 40A determines that the travel start condition is satisfied, because the positional deviation $\Delta J1$ between the stop-exit position P31 and the straight movement portion La4 is less than or equal to the threshold J10 (for example, less than or equal to 5 m) and the orientational deviation $\Delta F3$ is less than or equal to the threshold F10 (for example, less than or equal to 20° (deg)). On the other hand, when the selected straight movement portion Lan is the sixth straight movement portion La6, the autonomous travel controller 40A determines that the travel start condition is not satisfied, because the positional deviation $\Delta J1$ between the stop-exit position P31 and the straight movement portion La6 is greater than the threshold J10 (for example, greater than 5 m) and the orientational deviation $\Delta F3$ is less than or equal to the threshold F10 (for example, less than or equal to 20° (deg)).

Hereafter, for convenience of description, it is assumed that the selected straight movement portion Lan is the fourth straight movement portion La4. The fourth straight movement portion La4 will be referred to as the selected straight movement portion La4.

The autonomous travel controller 40A determines whether or not a line alignment condition is satisfied, when the tractor 1 is at the stop-exit position P31 and the travel start condition is satisfied with respect to the selected straight movement portion La4. The line alignment condition, which differs from the travel start condition, is a condition for determining whether or not to align the tractor 1 (the vehicle body 3) with a line when performing autonomous travel.

As illustrated in FIG. 12C, for example, at the stop-exit position P31 where the tractor 1 (the vehicle body 3) is stopped by manual travel, the autonomous travel controller 40A determines that the line alignment condition is not satisfied if the positional deviation $\Delta J5$ between the stop-exit position P31 of the tractor 1 (the vehicle body 3) and the selected straight movement portion La4, which is the selected planned travel line L1, is less the than the threshold J11 (for example, less than 0.1 m) or if the orientational deviation $\Delta F3$ between the orientation of the selected straight movement portion La4 and the vehicle-body orientation F1 is less than the threshold F11 (for example, less than 7° (deg)). On the other hand, the autonomous travel controller 40A determines that the line alignment condition is satisfied if the positional deviation $\Delta J5$ between the stop-exit position P31 of the tractor 1 (the vehicle body 3) and the selected straight movement portion La4 is greater than or equal to the threshold J11 and the orientational deviation $\Delta F3$ between the orientation of the selected straight movement portion La4 and the vehicle-body orientation F1 is greater than or equal to the threshold F11 (for example, greater than or equal to 7° (deg)).

That is, when a command to start traveling is issued, if the positional deviation ΔJ5 between the selected planned travel line L1 and the vehicle body 3 and/or the orientational deviation ΔF3 between the planned travel line L1 and the vehicle-body orientation F1 are or is greater than or equal to the respective first thresholds or the corresponding first threshold (greater than or equal to the threshold J11 and/or greater than or equal to the threshold F11), the autonomous travel controller 40A performs line alignment to make the positional deviation ΔJ5 and the orientational deviation ΔF3 less than the respective first thresholds (less than the threshold J11 and less than the threshold F11). Each of the first thresholds (threshold J11, threshold F11) to generate the line alignment condition is less than the corresponding one of the second thresholds (threshold J10, threshold F10) to generate the travel start condition. In other words, each of the second thresholds (threshold J10, threshold F10) to generate the travel start condition is greater than or equal to the corresponding one of the first thresholds (threshold J11, threshold F11) to generate the line alignment condition.

As illustrated in FIG. 12D, when performing line alignment, the autonomous travel controller 40A performs a K-turn by moving the vehicle body 3 forward (S10) and then moving the vehicle body 3 backward (S11). As illustrated in FIG. 12D, for example, if the vehicle body 3 is shifted leftward with respect to the selected straight movement portion La4, the autonomous travel controller 40A steers the vehicle body 3 rightward so that the vehicle body 3 moves closer the selected straight movement portion La4 while moving forward. On the other hand, if the vehicle body 3 is shifted rightward with respect to the selected straight movement portion La4, the autonomous travel controller 40A steers the vehicle body 3 leftward so that the vehicle body 3 moves closer to the selected straight movement portion La4 while moving forward.

In line alignment, the autonomous travel controller 40A adjusts the orientational deviation ΔF3 to be less than the first threshold (less than the threshold F11) by steering the front wheels 7F when the vehicle body 3 moves backward after moving forward.

As illustrated in FIG. 12D, the autonomous travel controller 40A does not perform line alignment when the travel switch 85 is operated and a start command is issued at the stop-exit position P31 and if the distance L40 between the stop-exit position (vehicle body position), which is the position of the vehicle body 3, and an end portion of the planned travel line L1 in the movement direction of the vehicle body 3 (an end portion P40 of the selected straight movement portion La4) is less than a predetermined distance. For example, the autonomous travel controller 40A does not perform line alignment if the distance L40 is less than 3.0 m. As illustrated in FIG. 12E, when the straight movement portion Lan is bent (inflected) on the way, the autonomous travel controller 40A need not perform line alignment if the distance L40 between the vehicle body position of the vehicle body 3 and the inflection point P41 is less than a predetermined distance.

During line alignment, the autonomous travel controller 40A performs a forward movement of moving the vehicle body 3 forward (S10) and a backward movement of moving the vehicle body 3 backward (S11) as one K-turn. If the positional deviation ΔJ5 and/or the orientational deviation ΔF3 are or is still not less than the respective first thresholds or the corresponding first threshold (not less than the threshold J11 and/or not less than the threshold F11) by one K-turn, the autonomous travel controller 40A performs a K-turn a plurality of times by outputting control signals to the tractor 1. If the number of times of performing the K-turn becomes a predetermined number of times (greater than or equal to three times) in line alignment, the autonomous travel controller 40A starts autonomous travel after the K-turn is finished.

As illustrated in FIG. 6, the controller 40 may include a device information acquirer 40E. The device information acquirer 40E includes an electric/electronic circuit provided in the controller 40, a program stored in the controller 40, and the like. The device information acquirer 40E acquires device information on the type and the classification of the working device 2 attached to the vehicle body 3. For example, the controller 40 and the working device 2 are connected to each other via an onboard network N1. When the working device 2 is connected to the vehicle body 3, device information (type, classification) of the connected working device 2 is output from the working device 2 to the onboard network N1, and the device information acquirer 40E acquires the device information output to the onboard network N1. The device information acquirer 40E may display, on the screen of the display 80, a portion (input interface) where device information is to be input when a predetermined operation is performed, and may acquire the device information input to the input interface.

Even when the travel switch 85 is operated and a start command is issued at the stop-exit position P31, the autonomous travel controller 40A does not perform line alignment if the type and the classification of the working device 2 acquired by the device information acquirer 40E are those of a predetermined working device 2 and performs line alignment if the type and the classification of the working device 2 acquired by the device information acquirer 40E are not those of the predetermined working device 2. For example, when the working device 2 is a spreader such as a broadcaster or the like, the autonomous travel controller 40A does not perform line alignment, and, when a start command is issued, the autonomous travel controller 40A starts autonomous travel if the autonomous travel condition is satisfied. The type and the classification of the working device 2 described above are examples and are not limited.

In the preferred embodiment described above, whether or not to perform line alignment is determined based on the device information (type, classification) of the working device 2. However, for example, a selection screen may be displayed on the display 80, and whether or not to perform line alignment may be determined based on selection by an operator (user).

Figure 14:
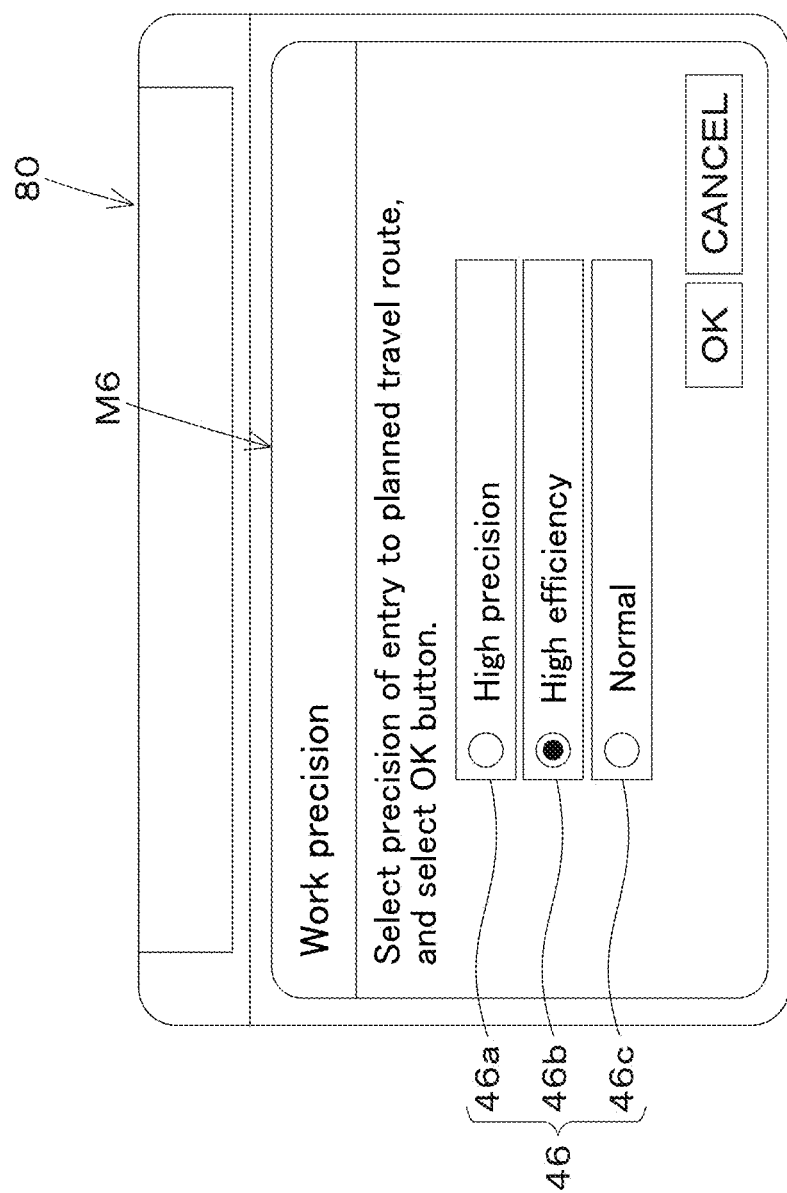
FIG. 14 illustrates an example of a setting screen.

The first threshold or thresholds may be changed based on the precision of work to be performed by the working device 2. As illustrated in FIG. 14, when a predetermined operation is performed, the display 80 displays a setting screen M6. The setting screen M6 is a screen for displaying an input interface 46 for inputting the precision of work (work precision), and, for example, allows input of work precision that is classified into a plurality of levels. To be specific, the input interface 46 includes a first input interface 46a to input (select) "high precision", a second input interface 46b to input (select) "high efficiency", and a third input interface 46c to input (select) "normal". The term "high efficiency" means performing work quickly, and the term "high precision" means performing work precisely.

For example, when "normal" is selected on the setting screen M6, the autonomous travel controller 40A sets the first threshold (threshold J11, threshold F11) to a value set as a default (default value). When "high efficiency" is selected on the setting screen M6, the autonomous travel controller 40A sets each of the first thresholds (threshold J11, threshold F11) to a value (first set value) that is greater than the default value corresponding to "normal", and thus makes it difficult to perform line alignment.

When "high precision" is selected on the setting screen M6, the autonomous travel controller 40A sets each of the first thresholds (threshold J11, threshold F11) to a value (second set value) that is less than the default value corresponding to "normal", and thus makes it easy to perform line alignment than normal. In this way, by changing the first threshold or thresholds in accordance with work precision, it is possible to make it easier to perform line alignment as the work precision increases (toward the high precision side) and to make it more difficult to perform line alignment as the work precision decreases (toward the high efficiency side).

The work precision described above is an example, and the levels at which work precision is to be set, that is, the number of input interfaces is not limited as long as the number is plural.

In the preferred embodiment described above, as illustrated in FIGS. 12C and 12D, a case where the tractor 1 is stopped at a predetermined position in the planned travel line L1 by manual travel after interrupting autonomous travel has been described. However, in the agricultural field H1, a case where the tractor 1 is moved closer to a position before starting autonomous travel, that is, the start position P1 is also applicable.

When a start command by the travel switch 85 is issued, if the vehicle body position detected by the position detector 30 is a start position defined in the planned travel line L1, the autonomous travel controller 40A performs position alignment for aligning the vehicle body position with the start position. For example, at the start position P1, if an operator or the like who has exited the tractor 1 in a state in which travel start condition is satisfied operates the travel switch 85, the autonomous travel controller 40A determines whether or not the travel start condition and the line alignment condition are satisfied. When the line alignment condition is satisfied, around the start position P1, the autonomous travel controller 40A performs line alignment for aligning the tractor 1 (the vehicle body 3) with the first straight movement portion Lal by moving the vehicle body 3 forward and backward, in the same way as in FIG. 12D.

In the preferred embodiment described above, the controller 40 (the autonomous travel controller 40A) determines that the travel start condition is satisfied if the positional deviation ΔJ1 is less than or equal to the threshold J10 and the orientational deviation ΔF3 is less than or equal to the threshold F10. However, the controller 40 may determine that the travel start condition is satisfied if either one of a condition that the positional deviation ΔJ1 is less than or equal to the threshold J10 (first condition) and a condition that the orientational deviation ΔF3 is less than or equal to the threshold F10 (second condition) is satisfied. That is, the controller 40 (the autonomous travel controller 40A) may determine that the travel start condition is satisfied if either one of the first condition and the second condition is satisfied.

In the preferred embodiment described above, the controller 40 (the autonomous travel controller 40A) determines that the line alignment condition is satisfied if the positional deviation ΔJ5 is greater than or equal to the threshold J11 and the orientational deviation ΔF3 is greater than or equal to the threshold F11. However, the controller 40 may determine that the line alignment condition is satisfied if either one of a condition that the positional deviation ΔJ5 is greater than or equal to the threshold J11 (third condition) and a condition that the orientational deviation ΔF3 is greater than or equal to the threshold F11 (fourth condition) is satisfied. That is, the controller 40 (the autonomous travel controller 40A) may determine that the line alignment condition is satisfied if either one of the third condition and the fourth condition is satisfied.

Figure 13:
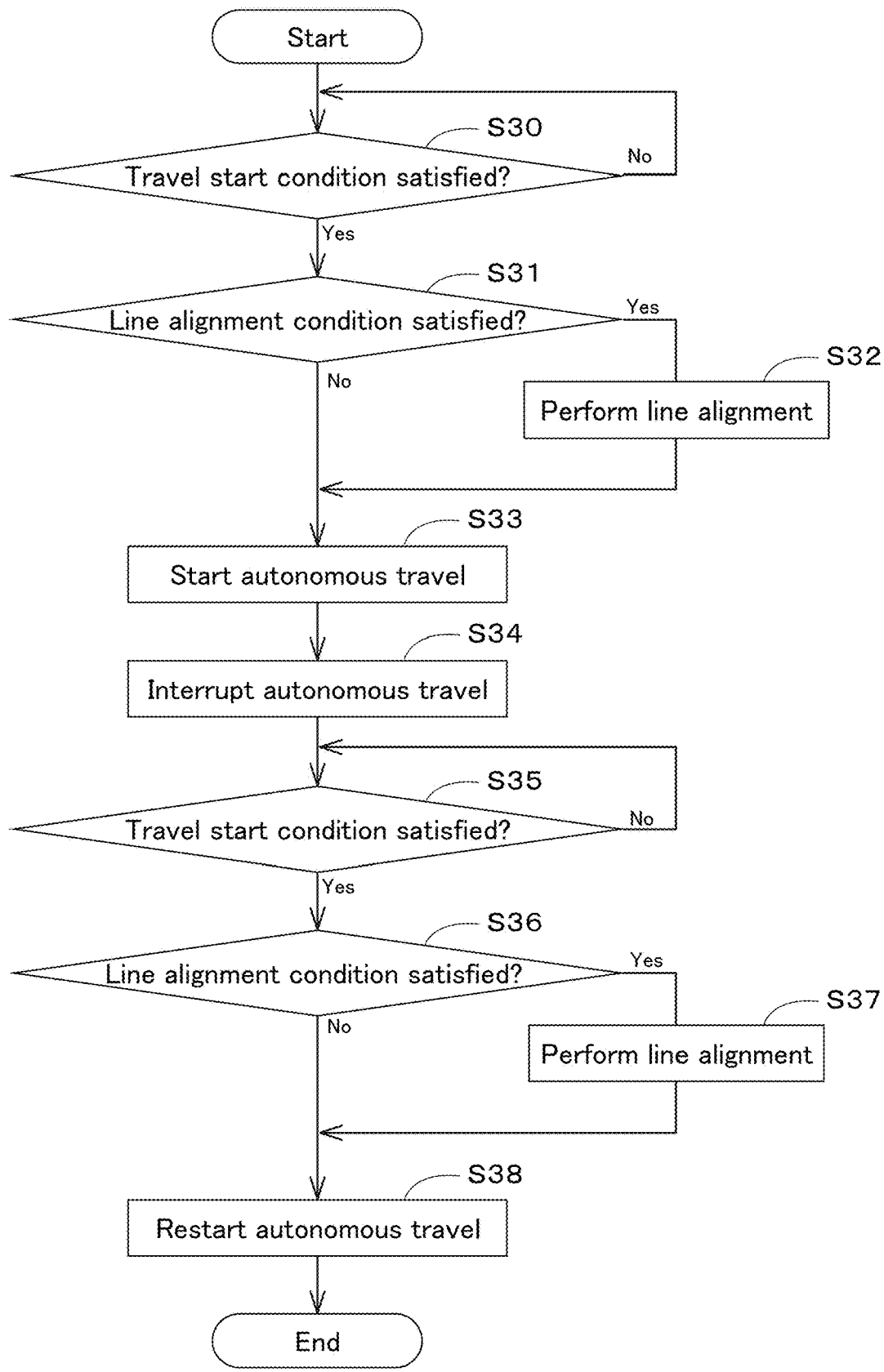
FIG. 13 is a flow illustrating an autonomous travel operation.

FIG. 13 illustrates a flow of an autonomous travel operation. As illustrated in FIG. 13, when the tractor 1 enters the agricultural field H1 and starts autonomous travel for the first time in the agricultural field H1, if the controller 40 acquires a start command due to an operation on the travel switch 85, the autonomous travel controller 40A determines whether or not the travel start condition is satisfied (S30). If the travel start condition is satisfied (S30, Yes), the autonomous travel controller 40A determines whether or not the line alignment condition is satisfied (S31). If the line alignment condition is satisfied (S31, Yes), the autonomous travel controller 40A performs line alignment (S32). If the line alignment condition is not satisfied (S31, No), the autonomous travel controller 40A starts autonomous travel (S33). If the controller 40 acquires an interruption command due to an operation on the travel switch 85, the autonomous travel controller 40A interrupts (stops) autonomous travel (S34). After interruption of autonomous travel, if the controller 40 acquires a start command, the autonomous travel controller 40A determines whether or not the travel start condition is satisfied (S35). If the travel start condition is satisfied (S35, Yes), the autonomous travel controller 40A determines whether or not the line alignment condition is satisfied (S36). If the line alignment condition is satisfied (S36, Yes), the autonomous travel controller 40A performs line alignment (S37). If the line alignment condition is not satisfied (S36, No), the autonomous travel controller 40A restarts autonomous travel (S38). The autonomous travel controller 40A restarts autonomous travel (S38) after performing a K-turn by line alignment at least once.

The agricultural machine 1 includes the vehicle body 3, the travel switch 85 operable to issue a command to start autonomous travel of the vehicle body 3, and the autonomous travel controller 40A to perform autonomous travel of the vehicle body 3 based on the planned travel line L1 when the command is issued. When the command is issued by operating the travel switch 85, if at least one of the positional deviation ΔJ5 between the planned travel line L1 that is selected and the vehicle body 3 and the orientational deviation ΔF3 between the planned travel line L1 and an orientation of the vehicle body 3 is greater than or equal to a corresponding one of the respective first thresholds (J11, F11), the autonomous travel controller 40A is configured or programmed to perform line alignment to make the positional deviation ΔJ5 and the orientational deviation ΔF3 less than the respective first thresholds (J11, F11). Thus, for example, in a case of performing autonomous travel for the first time or in a case of restarting autonomous travel from any position after interrupting autonomous travel on the way, when the command by the travel switch 85 is issued, it is possible to perform line alignment for making the positional deviation ΔJ5 and the orientational deviation ΔF3 less than the respective first thresholds (J11, F11). That is, it is possible to smoothly shift to autonomous travel when performing autonomous travel at least after moving the vehicle body 3 that has deviated from the planned travel line L1 closer to the planned travel line L1.

The planned travel line L1 includes the straight movement portion Lan to cause the vehicle body 3 to move straight and the turning portion Lbn to cause the vehicle body 3 to turn. The autonomous travel controller 40A is configured or programmed to determine whether at least one of the positional deviation ΔJ5 between the straight movement portion Lan and the vehicle body 3 and the orientational deviation ΔF3 between the straight movement portion Lan and the orientation of the vehicle body 3 is greater than or equal to the corresponding first threshold (J11, F11), and, if the at least one of the positional deviation ΔJ5 and the orientational deviation ΔF3 is greater than or equal to the corresponding first threshold (J11, F11), make, as the line alignment, the positional deviation ΔJ5 and the orientational deviation ΔF3 with respect to the straight movement portion Lan less than the respective first thresholds (J11, F11). Thus, when starting straight autonomous travel from any position in the planned travel line L1, it is possible to smoothly shift to straight autonomous travel, because it is possible to perform line alignment such that one of the positional deviation ΔJ5 between the straight movement portion Lan and the vehicle body 3 and the orientational deviation ΔF3 between the straight movement portion Lan and the orientation of the vehicle body 3 is made small.

Figure 12F:
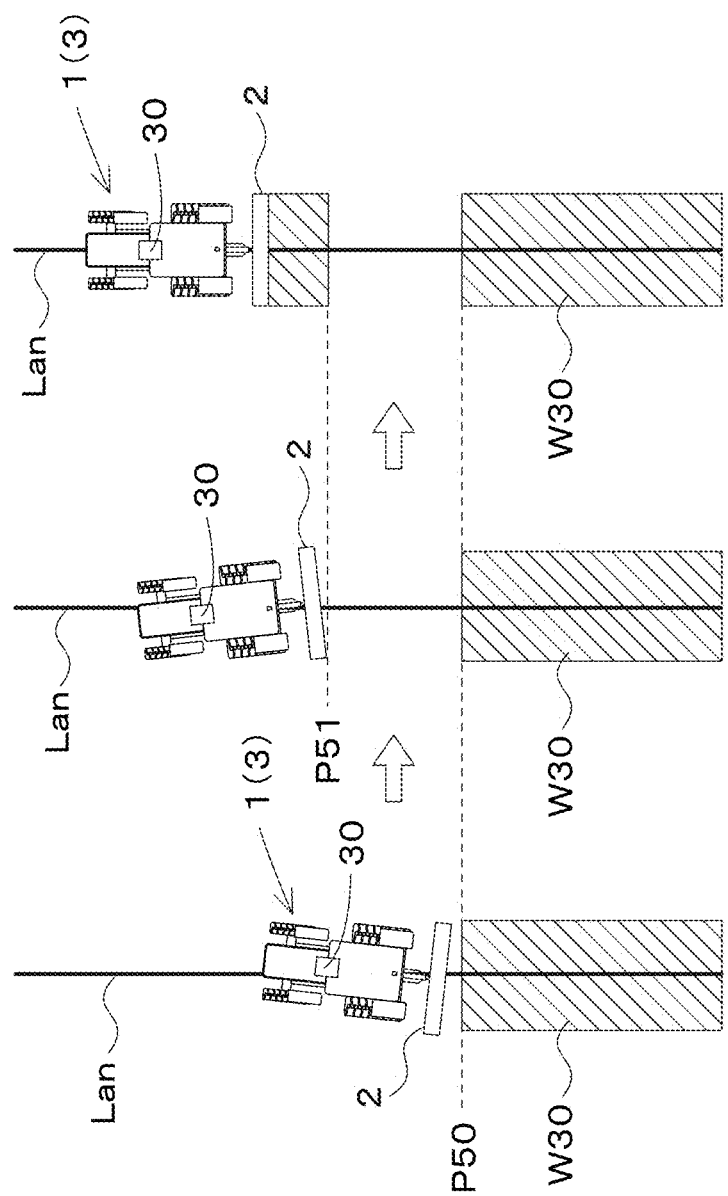
FIG. 12F illustrates an example in which autonomous travel is started from a middle portion of a planned travel line.

For example, it is easy to perform line alignment of the agricultural machine 1 with respect to the straight movement portion Lan when, for example, restarting autonomous travel from any position P51 in FIG. 12F after temporarily stopping work by the working device 2 due to autonomous travel at the position P50. As a result, as illustrated in FIG. 12F, it is possible to change a place W30 where the working device 2 has finished work in any appropriate way. The three straight movement portions Lan in FIG. 12F are the same straight movement portions Lan.

The autonomous travel controller 40A is configured or programmed to perform the line alignment by controlling traveling and steering of the vehicle body 3. In the line alignment, the autonomous travel controller 40A is configured or programmed to perform a K-turn by moving the vehicle body 3 forward and then moving the vehicle body 3 backward. Thus, as illustrated in FIG. 12D, it is easy to align the vehicle body 3 with the planned travel line L1.

In the line alignment, the autonomous travel controller 40A is configured or programmed to perform the K-turn a plurality of times and start the autonomous travel if the number of times that the K-turn is performed becomes greater than or equal to a predetermined number of times. Thus, it is possible to start autonomous travel after adjusting the posture of the vehicle body 3 with respect to the planned travel line L1 by performing the line alignment a plurality of times.

The autonomous travel controller 40A is configured or programmed to not perform the line alignment if the distance L40 between a vehicle body position that is the position of the vehicle body 3 when a command is issued by operating the travel switch 85 and an end portion of the planned travel line L1 in the movement direction of the vehicle body 3 is less than a predetermined distance. Thus, even when starting autonomous travel on the way, if the distance from the present position of the agricultural machine 1 at present (vehicle body position) to the end portion of the planned travel line L1 is short and the K-turn is difficult, it is possible to suppress an undesirable K-turn by shifting to autonomous travel without performing line alignment.

The agricultural machine 1 includes the device information acquirer 40E to acquire device information about the working device 2 attached to the vehicle body 3, and the autonomous travel controller 40A determines whether or not to perform the line alignment based on the device information acquired by the device information acquirer 40E. The autonomous travel controller 40A is configured or programmed to not perform the line alignment if the working device 2 indicated by the device information is a predetermined working device 2. Thus, it is possible to start autonomous travel without performing the line alignment only for the predetermined working device 2.

The agricultural machine 1 includes the position detector 30 to detect a vehicle body position that is the position of the vehicle body 3, and, when a command is issued by operating the travel switch 85, if the vehicle body position detected by the position detector 30 is a start position defined in the planned travel line L1, the autonomous travel controller 40A is configured or programmed to perform position alignment to align the vehicle body position with the start position. Thus, when starting autonomous travel for the first time, that is, when starting autonomous travel after moving the agricultural machine 1 closer to the start position, it is easy to align the posture of the agricultural machine 1 with the planned travel line L1.

The autonomous travel controller 40A is configured or programmed to perform autonomous travel of the vehicle body 3 if at least one of the positional deviation ΔJ5 and the orientational deviation ΔF3 is less than or equal to the corresponding second threshold (J10, F10) greater than the corresponding first threshold (J11, F11). Thus, it is possible to determine whether to perform line alignment by using the first threshold(s) (J11, F11) after determining whether or not autonomous travel can be started by using second threshold(s) (J10, F10). Therefore, it is possible to perform both of starting autonomous travel without performing line alignment and starting autonomous travel after performing line alignment, and it is possible to smoothly shift to autonomous travel in accordance with the situation.

The autonomous travel controller 40A is configured or programmed to determine, if at least one of the positional deviation ΔJ5 and the orientational deviation ΔF3 is less than or equal to the corresponding second threshold (J10, F10), whether or not the at least one of the positional deviation ΔJ5 and the orientational deviation ΔF3 is greater than or equal to the corresponding first threshold (J11, F11), perform the line alignment and then perform autonomous travel of the vehicle body 3 if the at least one of the positional deviation ΔJ5 and the orientational deviation ΔF3 is greater than or equal to the corresponding first threshold (J11, F11), and not perform the line alignment but perform autonomous travel of the vehicle body 3 if the at least one of the positional deviation ΔJ5 and the orientational deviation ΔF3 is not greater than or equal to the corresponding first threshold (J11, F11).

The agricultural machine 1 includes the input interface 46 to input precision of work of the working device 2, and the autonomous travel controller 40A is configured or programmed to change the first threshold or thresholds (J11, F11) based on the precision of the work input by the input interface 46.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural machine comprising:
a vehicle body;
a travel switch operable to issue a command to start autonomous travel of the vehicle body; and
an autonomous travel controller to perform the autonomous travel in which the autonomous travel controller adjusts steering and a vehicle speed of the vehicle body based on a planned travel line when the command to start the autonomous travel of the vehicle body is issued by the travel switch; wherein
when the command to start the autonomous travel is issued by the travel switch, if at least one of a positional deviation between a selected straight movement portion which is a straight movement portion of the planned travel line that is selected and the vehicle body and an orientational deviation between the selected straight movement portion and an orientation of the vehicle body is greater than or equal to a corresponding one of respective first thresholds, the autonomous travel controller is configured or programmed to perform line alignment to make the positional deviation and the orientational deviation less than the respective first thresholds and then to start the autonomous travel; and
the autonomous travel controller is configured or programmed to perform a K-turn at least once in the line alignment, the K-turn being a turn which is performed by moving the vehicle body forward and steering the vehicle body such that the vehicle body moves closer to the selected straight movement portion and then moving the vehicle body backward while steering the vehicle body to adjust the orientational deviation to be less than the corresponding one of the first thresholds.

2. The agricultural machine according to claim 1, further comprising a display to display the planned travel time; wherein
the planned travel line includes a plurality of the straight movement portions to cause the vehicle body to move straight and a turning portion to cause the vehicle body to turn; and
when the command to start the autonomous travel is issued by the travel switch after the autonomous travel based on the planned travel line is interrupted:
an operator is able to select the selected straight movement portion which is one of the plurality of straight movement portions displayed on the display that is where the autonomous travel is to be restarted, and then the operator is able to manually operate the vehicle body to move to a place around the selected straight movement portion; and
the autonomous travel controller is configured or programmed to determine whether at least one of the positional deviation and the orientational deviation is greater than or equal to the corresponding first threshold, and, if the at least one of the positional deviation and the orientational deviation is greater than or equal to the corresponding first threshold, perform the line alignment.

3. The agricultural machine according to claim 2, wherein the autonomous travel controller is configured or programmed to not perform the line alignment if a distance between a vehicle body position that is a position of the vehicle body when the command to start the autonomous travel is issued by the travel switch and an end portion of the selected straight movement portion in a movement direction of the vehicle body is less than a predetermined distance.

4. The agricultural machine according to claim 2, further comprising:
a device information acquirer configured or programmed to acquire device information about a working device attached to the vehicle body output from the working device; wherein
the autonomous travel controller is configured or programmed to determine whether or not to perform the line alignment based on the device information acquired by the device information acquirer.

5. The agricultural machine according to claim 1, wherein the autonomous travel controller is configured or programmed to perform the line alignment by controlling traveling and steering of the vehicle body.

6. The agricultural machine according to claim 5, wherein the autonomous travel controller is configured or programmed to not perform the line alignment if a distance between a vehicle body position that is a position of the vehicle body when the command to start the autonomous travel is issued by the travel switch and an end portion of the selected straight movement portion in a movement direction of the vehicle body is less than a predetermined distance.

7. The agricultural machine according to claim 5, further comprising:
a device information acquirer configured or programmed to acquire device information about a working device attached to the vehicle body output from the working device; wherein
the autonomous travel controller is configured or programmed to determine whether or not to perform the line alignment based on the device information acquired by the device information acquirer.

8. The agricultural machine according to claim 1, wherein the autonomous travel controller is configured or programmed to, in the line alignment, perform the K-turn a plurality of times and start the autonomous travel if the number of times that the K-turn is performed becomes greater than or equal to a predetermined number of times.

9. The agricultural machine according to claim 8, wherein the autonomous travel controller is configured or programmed to not perform the line alignment if a distance between a vehicle body position that is a position of the vehicle body when the command to start the autonomous travel is issued by the travel switch and an end portion of the selected straight movement portion in a movement direction of the vehicle body is less than a predetermined distance.

10. The agricultural machine according to claim 8, further comprising:
a device information acquirer configured or programmed to acquire device information about a working device attached to the vehicle body output from the working device; wherein
the autonomous travel controller is configured or programmed to determine whether or not to perform the line alignment based on the device information acquired by the device information acquirer.

11. The agricultural machine according to claim 1, wherein the autonomous travel controller is configured or programmed to not perform the line alignment if a distance between a vehicle body position that is a position of the vehicle body when the command to start the autonomous travel is issued by the travel switch and an end portion of the selected straight movement portion in a movement direction of the vehicle body is less than a predetermined distance.

12. The agricultural machine according to claim 11, further comprising:

a device information acquirer configured or programmed to acquire device information about a working device attached to the vehicle body output from the working device; wherein the autonomous travel controller is configured or programmed to determine whether or not to perform the line alignment based on the device information acquired by the device information acquirer.

13. The agricultural machine according to claim 1, further comprising:

a device information acquirer configured or programmed to acquire device information about a working device attached to the vehicle body output from the working device; wherein the autonomous travel controller is configured or programmed to determine whether or not to perform the line alignment based on the device information acquired by the device information acquirer.

14. The agricultural machine according to claim 13, wherein the autonomous travel controller is configured or programmed to not perform the line alignment if a type of the working device indicated by the device information is a predetermined type of working device.

15. The agricultural machine according to claim 1, further comprising:

a position detector to detect a vehicle body position that is a position of the vehicle body using a satellite positioning system; wherein the autonomous travel controller is configured or programmed to, when the command to start the autonomous travel is issued by the travel switch before the autonomous travel is started, if the vehicle body position detected by the position detector is a start position defined in the planned travel line, perform the line alignment to align the vehicle body with a first one of a plurality of the straight movement portions that has the start position defined therein by moving the vehicle body forward and backward in a place around the start position.

16. The agricultural machine according to claim 1, wherein the autonomous travel controller is configured or programmed to perform the line alignment and then start the autonomous travel if at least one of the positional deviation and the orientational deviation is greater than or equal to the corresponding first threshold and is less than or equal to a corresponding one of respective second thresholds greater than the corresponding first threshold when the command to start the autonomous travel is issued by the travel switch.

17. The agricultural machine according to claim 16, wherein the autonomous travel controller is configured or programmed to:

determine, if at least one of the positional deviation and the orientational deviation is less than or equal to the corresponding second threshold, whether or not the at least one of the positional deviation and the orientational deviation is greater than or equal to the corresponding first threshold;

perform the line alignment and then perform the autonomous travel if the at least one of the positional deviation and the orientational deviation is greater than or equal to the corresponding first threshold; and not perform the line alignment but perform the autonomous travel if the positional deviation and the orientational deviation are each not greater than or equal to the corresponding first threshold.

18. The agricultural machine according to claim 1, further comprising:

an input interface to input precision of work of a working device attached to the vehicle body; wherein the autonomous travel controller is configured or programmed to change one or more of the first thresholds such that the one or more of the first thresholds decreases as the precision of the work input by the input interface increases.

* * * * *